United States Patent
Hanschen et al.

(10) Patent No.: US 10,272,655 B2
(45) Date of Patent: Apr. 30, 2019

(54) FILM WITH ALTERNATING STRIPES AND STRANDS AND APPARATUS AND METHOD FOR MAKING THE SAME

(71) Applicant: 3M INNOVATIVE PROPERTIES COMPANY, St. Paul, MN (US)

(72) Inventors: Thomas P. Hanschen, Mendota Heights, MN (US); Ronald W. Ausen, St. Paul, MN (US); Paul S. Wallis, Swansea (GB); William J. Kopecky, Hudson, WI (US); Vathsala Rajagopal, Woodbury, MN (US); William H. Sikorski, Jr., White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 96 days.

(21) Appl. No.: 13/633,396

(22) Filed: Oct. 2, 2012

(65) Prior Publication Data
US 2014/0093716 A1    Apr. 3, 2014

(51) Int. Cl.
*B32B 5/02* (2006.01)
*B29C 47/14* (2006.01)
(Continued)

(52) U.S. Cl.
CPC ............ *B32B 27/32* (2013.01); *B29C 47/145* (2013.01); *B32B 5/022* (2013.01); *B32B 5/04* (2013.01);
(Continued)

(58) Field of Classification Search
CPC ....... B32B 5/04; B32B 2307/51; B32B 5/022; B32B 27/12; B32B 5/142; B32B 5/14;
(Continued)

(56) References Cited

U.S. PATENT DOCUMENTS 3,012,275 A    12/1961    Nalle, Jr.
3,204,290 A    9/1965    Crompton
(Continued)

FOREIGN PATENT DOCUMENTS

AU    B-73074/91    10/1991
DE    19806452    8/1999
(Continued)

OTHER PUBLICATIONS

Polymer Properties, Manufacturing Processes for Engineered Materials, 5th Edition, 2008, Pearson Education.*
(Continued)

*Primary Examiner* — Camie S Thompson

(57) ABSTRACT

A film comprising stripes alternating with strands is disclosed. In some embodiments, the strands have a core and a sheath. The core is more elastic than both the sheath and the strands. In some embodiments, the film has an elongation of at least 75 percent, the width of the strands is in a range from 100 micrometers to 750 micrometers, and a portion of each strand forms part of at least one major surface of the film. An extrusion die useful for making the film and a method for making the film using the extrusion die are also disclosed.

20 Claims, 9 Drawing Sheets

(51) Int. Cl.
  *B32B 27/12* (2006.01)
  *B32B 27/32* (2006.01)
  *B32B 5/04* (2006.01)
  *B29C 47/00* (2006.01)
  *D01F 8/00* (2006.01)
  *B32B 7/02* (2019.01)
  *B32B 7/12* (2006.01)

(52) U.S. Cl.
  CPC .......... *B32B 7/02* (2013.01); *B32B 7/12* (2013.01); *B32B 27/12* (2013.01); *B29C 47/0021* (2013.01); *B32B 2307/51* (2013.01); *B32B 2307/54* (2013.01); *B32B 2307/726* (2013.01); *B32B 2535/00* (2013.01); *B32B 2555/00* (2013.01); *B32B 2555/02* (2013.01); *B32B 2556/00* (2013.01); *Y10T 428/249921* (2015.04)

(58) Field of Classification Search
  CPC .......... B32B 5/026; B32B 5/08; B32B 25/10; B32B 3/18; B32B 2555/00; B32B 2038/0028; B04C 47/00; B04C 47/0021; B29C 47/0021; B29C 47/145; B29C 47/065; B29C 47/062; Y10T 442/60; Y10T 428/249921; Y10T 428/24636; Y10T 428/24694; Y10T 156/10
  USPC .......... 428/221, 98, 152, 174, 175, 182, 198; 425/133.5
  See application file for complete search history.

(56) References Cited

U.S. PATENT DOCUMENTS

| | | |
|---|---|---|
| 4,087,226 A | 5/1978 | Mercer |
| 4,435,141 A | 3/1984 | Weisner |
| 4,460,364 A | 7/1984 | Chen |
| 4,517,714 A | 5/1985 | Sneed |
| 4,525,407 A | 6/1985 | Ness |
| 4,533,510 A | 8/1985 | Nissel |
| 4,554,191 A | 11/1985 | Korpman |
| 4,725,473 A | 2/1988 | Van Gompel |
| 4,780,258 A | 10/1988 | Cloeren |
| 4,787,897 A | 11/1988 | Torimae |
| 4,842,791 A * | 6/1989 | Gould .......... B29C 47/0021 264/173.12 |
| 5,017,116 A | 5/1991 | Carter |
| 5,120,484 A | 6/1992 | Cloeren |
| 5,143,679 A | 9/1992 | Weber |
| 5,151,092 A | 9/1992 | Buell |
| 5,156,793 A | 10/1992 | Buell |
| 5,167,897 A | 12/1992 | Weber |
| 5,196,000 A | 3/1993 | Clear |
| 5,196,247 A | 3/1993 | Wu |
| 5,221,274 A | 6/1993 | Buell |
| 5,344,691 A | 9/1994 | Hanschen |
| 5,366,782 A | 11/1994 | Curro |
| 5,422,172 A | 6/1995 | Wu |
| 5,429,856 A | 7/1995 | Krueger |
| 5,527,304 A | 6/1996 | Buell |
| 5,605,739 A | 2/1997 | Stokes |
| 5,620,780 A | 4/1997 | Krueger |
| 5,674,216 A | 10/1997 | Buell |
| 5,679,379 A | 10/1997 | Fabbricante |
| 5,773,374 A | 6/1998 | Wood |
| 5,800,903 A | 9/1998 | Wood |
| 5,840,412 A | 11/1998 | Wood |
| 5,851,935 A | 12/1998 | Srinivasan |
| 5,861,074 A | 1/1999 | Wu |
| 5,900,306 A | 5/1999 | Stopper |
| 5,993,940 A | 11/1999 | Ouderkirk |
| 6,001,460 A | 12/1999 | Morman |
| 6,030,372 A | 2/2000 | Buell |
| 6,069,097 A | 5/2000 | Suzuki |
| 6,090,234 A | 7/2000 | Barone |
| 6,096,668 A | 8/2000 | Abuto |
| 6,103,152 A | 8/2000 | Gehlsen et al. |
| 6,159,544 A | 12/2000 | Liu |
| 6,159,584 A | 12/2000 | Eaton |
| 6,190,758 B1 | 2/2001 | Stopper |
| 6,221,483 B1 | 4/2001 | Hilston |
| 6,245,401 B1 | 6/2001 | Ying |
| 6,476,289 B1 | 11/2002 | Buell |
| 6,669,887 B2 | 12/2003 | Hilston |
| 6,682,514 B1 | 1/2004 | Brunner |
| 6,767,492 B2 | 7/2004 | Norquist |
| 6,902,796 B2 | 6/2005 | Morell |
| 6,949,283 B2 | 9/2005 | Kollaja |
| 6,986,825 B1 | 1/2006 | Squires |
| 7,048,818 B2 | 5/2006 | Krantz |
| 7,172,008 B2 | 2/2007 | Vanbenschoten |
| 7,316,840 B2 | 1/2008 | Neculescu |
| 7,316,842 B2 | 1/2008 | Zhou |
| 7,329,621 B2 | 2/2008 | Collier, IV |
| 7,438,961 B2 | 10/2008 | Steinke et al. |
| 7,625,829 B1 | 12/2009 | Cree |
| 7,651,653 B2 | 1/2010 | Morman |
| 7,678,316 B2 | 3/2010 | Ausen |
| 7,727,207 B2 | 6/2010 | Erdman |
| 7,803,244 B2 | 9/2010 | Siqueira |
| 7,897,078 B2 | 3/2011 | Petersen |
| 7,897,081 B2 | 3/2011 | Ausen |
| 7,968,479 B2 | 6/2011 | Welch |
| 8,222,169 B2 | 7/2012 | Lake |
| 8,257,333 B2 | 9/2012 | Hancock-Cooke |
| 2003/0105446 A1 | 6/2003 | Hutson |
| 2005/0060849 A1 | 3/2005 | Vanbenschoten |
| 2007/0108229 A1 | 5/2007 | Fork |
| 2007/0134465 A1 | 6/2007 | Vanbenschoten |
| 2007/0154683 A1 | 7/2007 | Ausen |
| 2007/0298262 A1 | 12/2007 | Quiram |
| 2008/0254281 A1* | 10/2008 | Chen .......... B29C 43/36 428/335 |
| 2009/0047855 A1* | 2/2009 | Seth .......... A61F 13/4902 442/329 |
| 2009/0258210 A1 | 10/2009 | Iyad |
| 2009/0306617 A1 | 12/2009 | Tsang |
| 2010/0215923 A1 | 8/2010 | Frost |
| 2011/0147475 A1 | 6/2011 | Biegler |
| 2011/0151171 A1 | 6/2011 | Biegler |
| 2011/0268906 A1 | 11/2011 | Ausen |
| 2012/0022490 A1 | 1/2012 | Marche |
| 2012/0052245 A1 | 3/2012 | Hoium |
| 2012/0172826 A1 | 7/2012 | Ng |
| 2012/0263906 A1 | 10/2012 | Ausen |
| 2012/0308755 A1 | 12/2012 | Gorman |
| 2014/0093703 A1 | 4/2014 | Hanschen et al. |
| 2014/0220328 A1 | 8/2014 | Ausen et al. |
| 2014/0248471 A1 | 9/2014 | Hanschen et al. |

FOREIGN PATENT DOCUMENTS

| | | |
|---|---|---|
| EP | 0191355 | 8/1986 |
| EP | 865904 | 9/1998 |
| EP | 872580 | 10/1998 |
| EP | 1757429 | 2/2007 |
| EP | 2340796 | 9/2011 |
| JP | 54-58762 | 5/1979 |
| JP | 55-21279 | 2/1980 |
| JP | 4-176626 | 6/1992 |
| JP | 8-300436 | 11/1996 |
| JP | 8-300531 | 11/1996 |
| JP | 9-11309 | 1/1997 |
| JP | 9-300436 | 11/1997 |
| JP | 2011-079255 | 4/2011 |
| WO | WO 91/15355 | 10/1991 |
| WO | WO 99/47590 | 9/1999 |
| WO | WO 2001-45918 | 6/2001 |
| WO | WO 2004-091896 | 10/2004 |
| WO | WO 2009/042556 | 4/2009 |
| WO | WO 2009-140392 | 11/2009 |
| WO | WO 2010-109087 | 9/2010 |
| WO | WO 2011-119323 | 9/2011 |

(56) References Cited

FOREIGN PATENT DOCUMENTS

| WO | WO 2011-119324 | 9/2011 |
|---|---|---|
| WO | WO 2011-119325 | 9/2011 |
| WO | WO 2011-119326 | 9/2011 |
| WO | WO 2011-119327 | 9/2011 |
| WO | WO 2012-038613 | 3/2012 |

OTHER PUBLICATIONS

PCT/US2012/051660, filed Aug. 21, 2012.
PCT/US2012/050746, filed Aug. 14, 2012.
PCT/US2012/057900, filed Sep. 28, 2012.
U.S. Appl. No. 61/615,676, filed Mar. 26, 2012.
International Search Report from International Application No. PCT/US2013/063031, dated Dec. 23, 2013.

\* cited by examiner

FILM WITH ALTERNATING STRIPES AND STRANDS AND APPARATUS AND METHOD FOR MAKING THE SAME

BACKGROUND

Co-extrusion of multiple polymeric components into a single film is known in the art. For example, multiple polymeric flow streams have been combined in a die or feedblock in a layered fashion to provide a top to bottom multilayer film. It is also known to provide co-extruded film structures where the film is partitioned, not as coextensive layers in the thickness direction, but as stripes along the width dimension of the film. This has sometimes been called "side-by-side" co-extrusion. Extruded products with side-by-side oriented stripes are described, for example, in U.S. Pat. No. 4,435,141 (Weisner et al.), U.S. Pat. No. 6,159,544 (Liu et al.), U.S. Pat. No. 6,669,887 (Hilston et al.), and U.S. Pat. No. 7,678,316 (Ausen et al.) and Int. Pat. App. Pub. No. WO 2011/119323 (Ausen et al.). Films having multiple segmented flows within a matrix of another polymer are described, for example, in U.S. Pat. No. 5,773,374 (Wood et al.).

SUMMARY

Even though products with side-by-side oriented stripes and extrusion devices for producing them are known, there is still a need for alternatives and improvements to such products and devices. The present disclosure provides a film having alternating strands and stripes and an apparatus and method for making the film. In some embodiments, the strands have a core/sheath structure. In these embodiments, the sheath typically forms part of at least one of the major surfaces of the film, and the stripes bridge the distances between the strands. At least portions of the strands are typically elastic while the stripes are relatively inelastic.

In one aspect, the present disclosure provides a film having alternating stripes and strands. The strands comprise a core and a sheath. The core is more elastic than both the sheath and the stripes. The stripes may be considered inelastic in some embodiments. In some embodiments, the stripes are made from a first polymeric composition that is found throughout the thickness of the stripes. In some embodiments, the sheath forms part of at least one major surface of the film. In some embodiments, the stripes are made from a first polymeric composition, the core is made from a third polymeric composition, and the sheath is made from a second polymeric composition that is different from the first polymeric composition and the third polymeric composition.

In another aspect, the present disclosure provides a film having alternating stripes and strands. At least portions of the strands are more elastic than the stripes. The stripes may be considered inelastic in some embodiments. The film has an elongation of at least 75 percent, and the width of the strands is in a range from 100 micrometers to 750 micrometers. A portion of each strand forms part of at least one major surface of the film.

In another aspect, the present disclosure provides a film article comprising an extensible region alongside a ribbon region, wherein the extensible region is the film of any of the foregoing aspects. The ribbon region can conveniently be made of a first polymeric composition, from which the stripes are made. In some embodiments, there are ribbon regions on both sides of one extensible region.

In another aspect, the present disclosure provides a laminate comprising the film or film article of any of the foregoing aspects joined to a fibrous carrier.

In another aspect, the present disclosure provides an extrusion die having at least a first cavity, a second cavity, a third cavity, a dispensing surface having a dispensing slot, and fluid passageways between the first, second, and third cavities and the dispensing slot. The fluid passageways comprise a first fluid passageway extending from the first cavity to the dispensing slot, a third fluid passageway extending from the third cavity to the dispensing slot, at least two second fluid passageways extending from the second cavity to the dispensing slot on either side of the third fluid passageway. Each of the second passageways has a dimension larger than the third passageway at the point where the third passageway enters the dispensing slot. In some embodiments, the fluid passageways are provided by a plurality of sequences of shims. In these embodiments, each sequence typically includes at least one first shim that provides the first fluid passageway, at least one third shim that provides the third fluid passageway, and at least two second shims that provide the at least two second fluid passageways. In some embodiments, the extrusion die also includes a fourth fluid passageway extending from the first cavity to the dispensing slot. The fourth fluid passageway may be provided, for example, by a plurality of shims, which may be a plurality of sequences of shims.

In another aspect, the present disclosure provides a method of making a film. The method includes providing the aforementioned extrusion die and extruding polymeric compositions from the first, second, and third cavities so as to form the film, which includes stripes alternating with strands having a core and a sheath. In some embodiments, the core is more elastic than both the stripes and the sheath. In some embodiments, a first polymeric composition is extruded from the first cavity, a second polymeric composition is extruded from the second cavity, and a third polymeric composition is extruded from the third cavity. In some embodiments, the film includes an extensible region alongside a ribbon region, in which the extensible region includes the alternating stripes and strands and the ribbon region comprises a film of the first polymeric composition, from which the stripes are made. Advantageously, the dies and methods disclosed herein allow the ribbon region and the extensible regions to be made simultaneous in a single co-extrusion process. The patterns of stripes and strands can be separated by zones of the first polymeric composition (or a different, fourth polymeric composition) that are wider than the stripes in the extensible region.

In another aspect, the present disclosure provides a method of controlling the caliper in an extruded film. The method includes providing an extrusion die comprising a plurality of shims positioned adjacent to one another, the shims together defining at least a first cavity and a die slot with a distal opening, and extruding a polymeric composition from the first cavity to provide the extruded film. Each of the plurality of shims defines a portion of the distal opening, wherein the plurality of shims includes first shims providing a passageway between the first cavity and the die slot with their distal openings together providing a dispensing opening in the die slot, and wherein the plurality of shims further includes spacer shims having a dispensing orifice but lacking a passageway between the dispensing orifice and the first cavity The caliper of the extruded film is controlled by adjusting the width of the dispensing opening between the spacer shims.

The films according to the present disclosure include a significant amount of material that is relatively inelastic in combination with elastic material, but still can have useful elongations when stretched in a direction transverse to the strands and stripes. Therefore, in the films disclosed herein, relatively expensive elastic materials are used efficiently, and the films disclosed herein can be lower in cost than other elastic films, which typically include higher amounts of elastic materials.

In some embodiments, in addition to exploiting efficient utilization of elastic polymeric compositions, the films disclosed herein can also be made to have very desirable hysteresis properties and may not require an "activation" step. In some embodiments, the films disclosed herein are stretched in a direction transverse to the stripes to the point where these stripes undergo permanent plastic deformation, and a "dead-stop" elastic film results. In some embodiments, the films disclosed herein are stretched in the direction of the stripes to provide a textured surface, which may allow the films to be utilized (e.g., in absorbent articles) without the need for nonwoven lamination.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The term "alternating" as used herein refers to one stripe being disposed between any two adjacent strands (i.e., the strands have only one stripe between them) and one strand being disposed between any two adjacent stripes.

The term "elastic" refers to any material (such as a film that is 0.002 mm to 0.5 mm thick) that exhibits recovery from stretching or deformation. A material, film, or composition that is more elastic than another material, film, or composition exhibits at least one of higher elongation or lower hysteresis (usually both) than another material, film, or composition. In some embodiments, a material may be considered to be elastic if upon application of a stretching force, it can be stretched to a length that is at least about 25 (in some embodiments, 50) percent of its initial length and can recover at least 40 percent of its elongation upon release of the stretching force.

The term "inelastic" refers to any material (such as a film that is 0.002 mm to 0.5 mm thick) that does not exhibit recovery from stretching or deformation to a large extent. For example, an inelastic material that is stretched to a length that is at least about 50 percent greater than its initial length will recover less than about 40, 25, 20, or 10 percent of its elongation upon release of its stretching force. In some embodiments, an inelastic material may be considered to be a flexible plastic that is capable of undergoing permanent plastic deformation if it is stretched past its reversible stretching region.

"Elongation" in terms of percent refers to {(the extended length−the initial length)/the initial length} multiplied by 100. Unless otherwise defined, when a film or portion thereof is said herein to have an elongation of at least 100 percent, it is meant that the film has an elongation to break of at least 100 percent using the test method described in the Examples, below.

The term "extensible" refers to a material that can be extended or elongated in the direction of an applied stretching force without destroying the structure of the material or material fibers. An extensible material may or may not have recovery properties. For example, an elastic material is an extensible material that has recovery properties. In some embodiments, an extensible material may be stretched to a length that is at least about 5, 10, 15, 20, 25, or 50 percent greater than its relaxed length without destroying the structure of the material or material fibers.

The term "machine direction" (MD) as used above and below denotes the direction of a running, continuous web during the manufacturing of the film disclosed herein. When a portion is cut from the continuous web, the machine direction corresponds to the longitudinal direction of the film. Accordingly, the terms machine direction and longitudinal direction may be used herein interchangeably. The term "cross-direction" (CD) as used above and below denotes the direction that is essentially perpendicular to the machine direction. When a portion of the film disclosed herein is cut from the continuous web, the cross-direction corresponds to the width of the film.

The terms "first", "second", and "third" are used in this disclosure. It will be understood that, unless otherwise noted, those terms are used in their relative sense only. For these components, the designation of "first", "second", and "third" may be applied to the components merely as a matter of convenience in the description of one or more of the embodiments.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings.

FIGS. 2A through 5A are expanded regions near the dispensing surfaces of exemplary shims shown in FIGS. 2 to 5, respectively;

DETAILED DESCRIPTION

Figure 1:
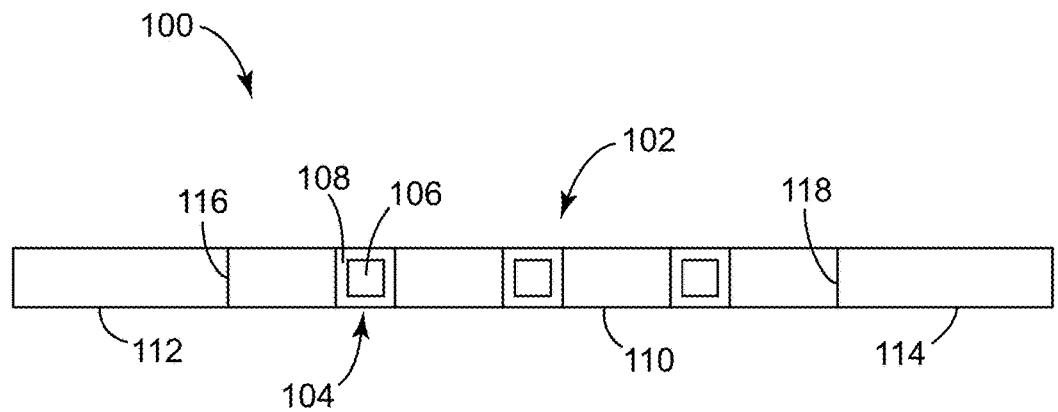
FIG. 1 is an end view of an exemplary film article having different zones in the cross-web direction.

Referring now to FIG. 1, an end view of an exemplary film article 100 having different regions across its width is shown. The film article 100 has an extensible region 102 which includes strands 104 comprised of a core 106 and a sheath 108. The strands 104 are separated from each other by stripes 110. Optionally, ribbon regions 112 and 114 may be present on one or both edges of the film article 100. When ribbon regions 112 and/or 114 are present, weld lines 116 and 118 may or may not be visible. In many embodiments, stripes 110 comprise a first polymeric composition, cores 106 comprise a third polymeric composition, and sheaths 108 comprise a second polymeric composition. Although not shown in the end view of FIG. 1, stripes 110 and strands 104 typically extend in the machine direction of the film article 100.

In the embodiment illustrated in FIG. 1, the first polymeric composition is found throughout the thickness of the stripes 110. In other words, the first polymeric composition extends from the top major surface, through the thickness, and to the bottom major surface of the film. It may be said that the stripes 110 are generally of uniform composition. In the illustrated embodiment, stripe 110 is, therefore, not surrounded by a sheath of another, different polymeric composition. However, in other embodiments, stripe 110 may have a sheath of another, different material.

In some embodiments, including the embodiment illustrated in FIG. 1, sheath 108 surrounds core 106. In other words, in these embodiments, the sheath 108 extends around the entire outer surface of core 106, which, in the end view of FIG. 1, is represented by the perimeter of core 106. However, the sheath 108 need not completely surround core 106. In some embodiments, the sheath may extend around at least 60, 75, or 80 percent of the outer surface of core 106, which, in the end view of FIG. 1, is represented by the perimeter of core 106. For example, the sheath 108 may separate core 106 and stripes 110 on either side of core 106 and extend around to partially cover the core 106 at the top and bottom surfaces of film 100 without completely covering the core 106 at the top and bottom surfaces of the film. In many embodiments, the sheath 108 forms part of at least one major surface of the film. In the illustrated embodiment, sheath 108 forms part of both the top and bottom major surfaces of the film; therefore, the first polymeric composition in the stripes does not bridge over the strands.

In films and film articles according to the present disclosure, including in the embodiment shown in FIG. 1, each of the stripes, cores, and sheaths may be considered monolithic (that is, having a generally uniform film composition) and would not be considered fibrous. Particularly, the stripes and the sheaths would not be considered nonwoven materials. However, in some embodiments described below, portions of the films and/or film articles may be apertured. Generally, the stripes, cores, and sheaths are co-extruded and melt bonded together. Furthermore, in films and film articles according to the present disclosure in any of their embodiments, the stripes and strands are in the same layer in the thickness direction. That is, the stripes and the strands may be considered to occupy the same plane, or any imaginary line drawn through the film from one longitudinal edge to the opposite longitudinal edge would touch both the strands and the stripes. The films and film articles themselves are typically extruded as single-layer in the thickness direction. However, as described below, it may be useful in some embodiments to make multi-layer articles from the films described herein.

The film article 100 of FIG. 1 is conveniently prepared by extrusion from a die having a variety of passageways from cavities within the die to a dispensing slot. The die may conveniently be comprised of a plurality of shims. In some embodiments, the plurality of shims comprises a plurality of sequences of shims that includes shims that provide a passageway between a first and second cavity and the dispensing slot. In some of these embodiments, there will be additional shims that provide a passageway between the first and/or the second cavity, and/or a third (or more) cavity and the dispensing slot.

In some embodiments, the shims will be assembled according to a plan that provides a sequence of shims of diverse types. Since different applications may have different requirements, the sequences can have diverse numbers of shims. The sequence may be a repeating sequence that is not limited to a particular number of repeats in a particular zone. Or the sequence may not regularly repeat, but different sequences of shims may be used. For a first example, an eight-shim sequence that when properly provided with molten polymer forms a segment of film of a single-material alternating with a core/sheath strand is described below in connection with FIG. 6.

The shape of the passageways within, for example, a sequence of shims, may be identical or different. Examples of passageway cross-sectional shapes include round, square, and rectangular shapes. In some embodiments, the shims that provide a passageway between one cavity and the dispensing slot might have a flow restriction compared to the shims that provide a passageway between another cavity and the dispensing slot. The width of the distal opening within, for example, a different shims of the sequence of shims, may be identical or different. For example, the portion of the distal opening provided by the shims that provide a passageway between one cavity and the dispensing slot could be narrower than the portion of the distal opening provided by the shims that provide a passageway between another cavity and the dispensing slot.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one or more of the cavities.

In some embodiments, the assembled shims (conveniently bolted between the end blocks) further comprise a manifold body for supporting the shims. The manifold body has at least one (or more (e.g., two or three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of the first, second, and third cavities), and such that the expansion seal allows a conduit between the manifold and the cavity.

In some embodiments, the shims for dies described herein have thicknesses in the range from 50 micrometers to 125 micrometers. Typically, the fluid passageways have thicknesses in a range from 50 micrometers to 750 micrometers, and heights less than 5 mm (with generally a preference for smaller heights for decreasingly smaller passageway thicknesses), although thicknesses and heights outside of these ranges may also be useful. In some embodiments, the fluid passageways can have heights in a range from 10 micrometers to 1.5 millimeters. For fluid passageways with large thicknesses or diameters, several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the dispensing slot, as misalignment can lead to strands extruding at an angle out of the die which may inhibit bonding between the stripes and the strands. To aid in alignment, an indexing groove can be cut into the shims to receive a key. Also, a vibrating table can be useful to provide a smooth surface alignment of the extrusion tip.

The size of the strands and stripes can be adjusted, for example, by the composition of the extruded polymers (e.g., materials, melt viscosities, additives, and molecular weight), pressure in the cavities, flow rate of the polymer stream, and/or the dimensions of the passageways.

Some of the embodiments of dies according to the present disclosure have a subsequence of shims in which a core/sheath strand is formed. This core/sheath strand is bonded to a stripe on one or both sides. As will be discussed with more particularity below in connection with FIG. 6, such dies can include a plurality of shims comprising a plurality of sequences of shims. Such sequences can include shims that provide a third fluid passageway between the third cavity and the dispensing slot, shims that provide at least two second passageways extending from the second cavity to the dispensing slot, wherein each of the two second passageways are on opposite longitudinal sides of the third passageway, and each of the two second passageways has a dimension larger than the third passageway at the point where the third passageway enters the dispensing slot. This allows the flows of the sheath polymeric composition from the second passageways to encapsulate the core polymeric composition entering the dispensing slot from the third passageway. Obtaining good encapsulation of the core polymeric composition entering from the third passageway depends in part on the melt viscosity of the polymeric composition that forms the sheath. In general, lower melt viscosity of the sheath-forming polymeric composition improves the encapsulation of the core. Further, the encapsulation depends in part on the degree to which the at least two second passageways have a dimension larger than the third passageway at the point when they enter the dispensing slot. In general, increasing the degree by which that dimension is larger in the second passageways relative to same dimension in the third passageway will improve the encapsulation of the core. Good results may be obtained when the dimensions of the passageways and pressures within the cavities are manipulated so that the flow speeds of the sheath polymeric composition and the core polymeric composition within the dispensing slot are close to one another.

In practicing methods described herein, the polymeric compositions might be solidified simply by cooling. This can be conveniently accomplished by, for example, quenching the extruded film or article on a chilled surface (e.g., a chilled roll). In some embodiments, it is desirable to maximize the time to quenching to increase the weld line strength.

In some embodiments of the film or the method of making the film according to the present disclosure, the film may be stretched in at least one direction. When the film or extruded article disclosed herein is a web of indefinite length, for example, monoaxial stretching in the machine direction, which is typically the direction parallel to the stripes and strands, can be performed by propelling the web over rolls of increasing speed. Means such as diverging rails and diverging disks are useful for cross-direction stretching, which is typically the direction transverse to the stripes and strands. A versatile stretching method that allows for monoaxial, sequential biaxial, or simultaneous biaxial stretching of a thermoplastic web employs a flat film tenter apparatus. Such an apparatus grasps the thermoplastic web using a plurality of clips, grippers, or other film edge-grasping means along opposing edges of the thermoplastic web in such a way that monoaxial, sequential biaxial, or simultaneous biaxial stretching in the desired direction is obtained by propelling the grasping means at varying speeds along divergent rails. Increasing clip speed in the machine direction generally results in machine-direction stretching. Monoaxial and biaxial stretching can be accomplished, for example, by the methods and apparatus disclosed in U.S. Pat. No. 7,897,078 (Petersen et al.) and the references cited therein. Flat film tenter stretching apparatuses are commercially available, for example, from Brückner Maschinenbau GmbH, Siegsdorf, Germany.

Films according to and/or made according to the present disclosure may have stretch-induced molecular orientation (e.g., in the stripes) after being stretched in at least one of the machine direction or cross-direction. Whether the stripes have stretch-induced molecular orientation can be determined by standard spectrographic analysis of the birefringent properties of the oriented polymer forming the stripes. The stripes or other portions of the film having stretch-induced molecular orientation may also be said to be birefringent, which means that the polymer in the stripes has different effective indexes of refraction in different directions. In the present application, whether the stripes or other portions of the film have stretch-induced molecular orientation is measured with a retardance imaging system available from Lot-Oriel GmbH & Co., Darmstadt, Germany, under the trade designation "LC-PolScope" on a microscope available from Leica Microsystems GmbH, Wetzlar, Germany, under the trade designation "DMRXE" and a digital CCD color camera available from QImaging, Surrey, BC, Canada, under the trade designation "RETIGA EXi FAST 1394". The microscope is equipped with a 546.5 nm interference filter obtained from Cambridge Research & Instrumentation, Inc., Hopkinton, Mass., and a 10×/0.25 objective. The degree of birefringence in a stripe is typically observed to be higher in a film that has been stretched to the point of plastic deformation than in a film that only has melt-induced orientation in the machine direction. The difference in degree of birefringence between stretch-induced molecular orientation and melt-induced orientation would be understood by a person skilled in the art.

Figure 2:
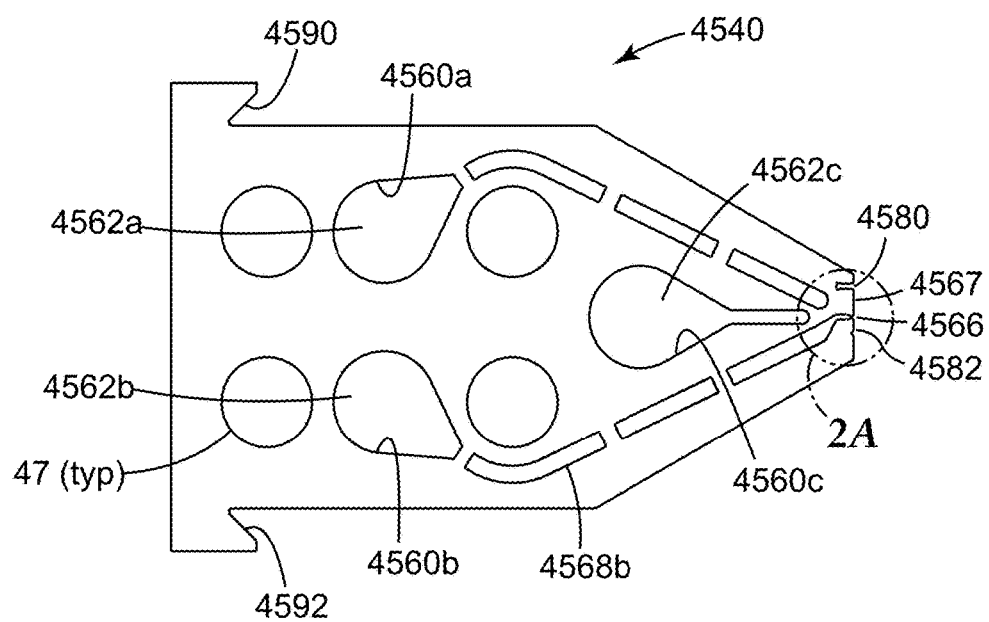
FIG. 2 is a plan view of an exemplary shim suited to form a sequence of shims capable of forming a film including stripes in an alternating arrangement with strands having a sheath/core construction.
Figure 5:
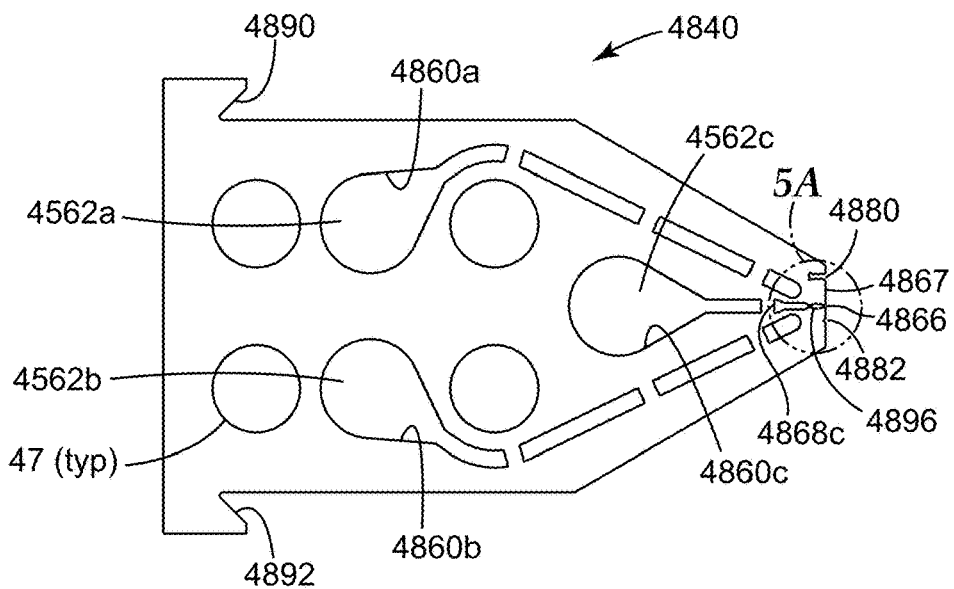
FIG. 5 is a plan view of yet another exemplary shim suited to form a sequence of shims capable of forming a film including stripes in an alternating arrangement with strands having a sheath/core construction.
Figure 3A:
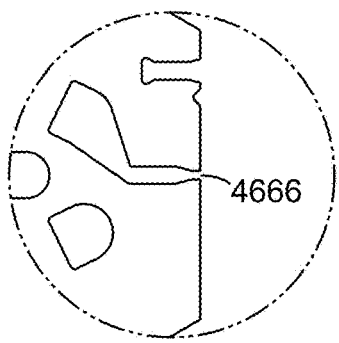
FIG. 3 is a plan view of another exemplary shim suited to form a sequence of shims capable of forming a film including stripes in an alternating arrangement with strands having a sheath/core construction.
Figure 4A:
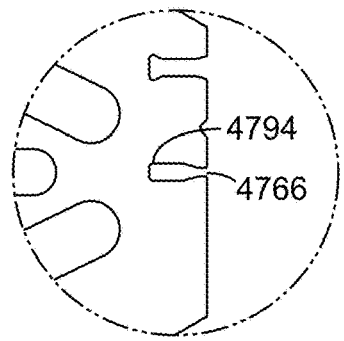
FIG. 4 is a plan view of yet another exemplary shim suited to form a sequence of shims capable of forming a film including stripes in an alternating arrangement with strands having a sheath/core construction.
Figure 3:
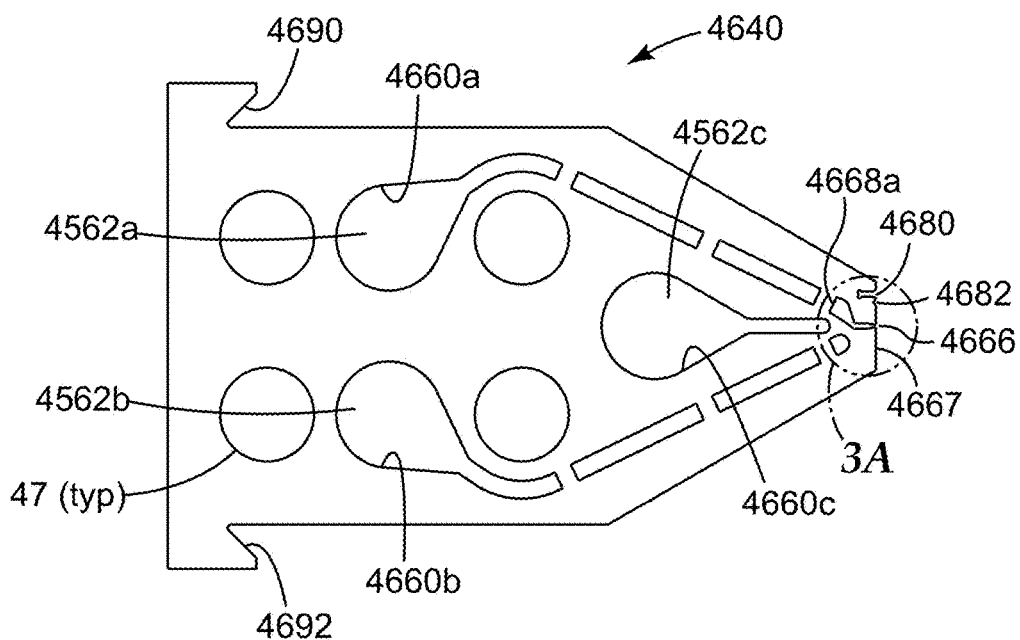
Figure 4:
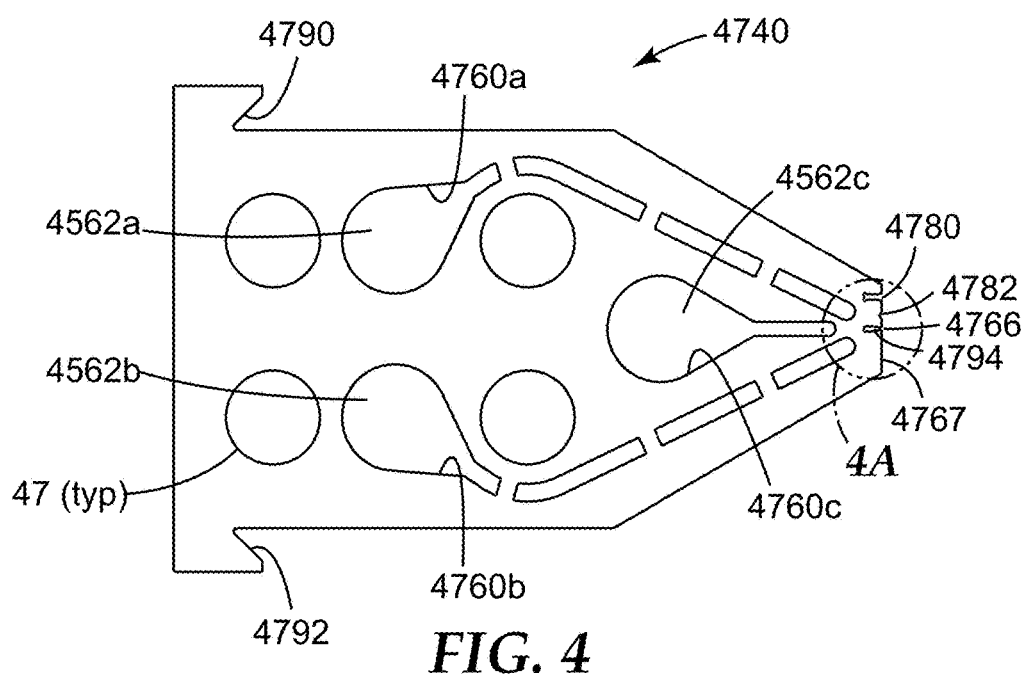

Referring now to FIG. 2, a plan view of shim 4540 is illustrated. Shim 4540 is useful in a plurality of sequences of shims shown in FIGS. 6 to 8. Other shims useful in these sequences are shown in FIGS. 3 to 5. Shim 4540 has first aperture, 4560a, second aperture 4560b, and third aperture 4560c. When shim 4540 is assembled with others as shown in FIG. 9, aperture 4560a will help define second cavity 4562a, aperture 4560b will help define first cavity 4562b, and aperture 4560c will help define third cavity 4562c. As will be discussed with more particularity below, molten polymer in cavities 4562a and 4562c can be extruded in a strand with a sheath/core arrangement, and molten polymer in cavity 4562b can be extruded as a stripe between those sheath/core strands so as to form the film or film article described herein.

Figure 2A:
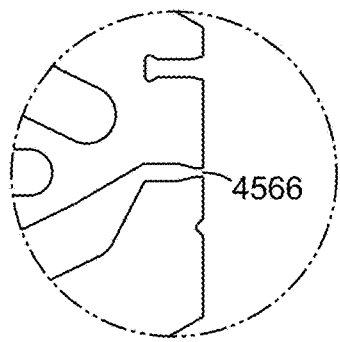
Figure 6:
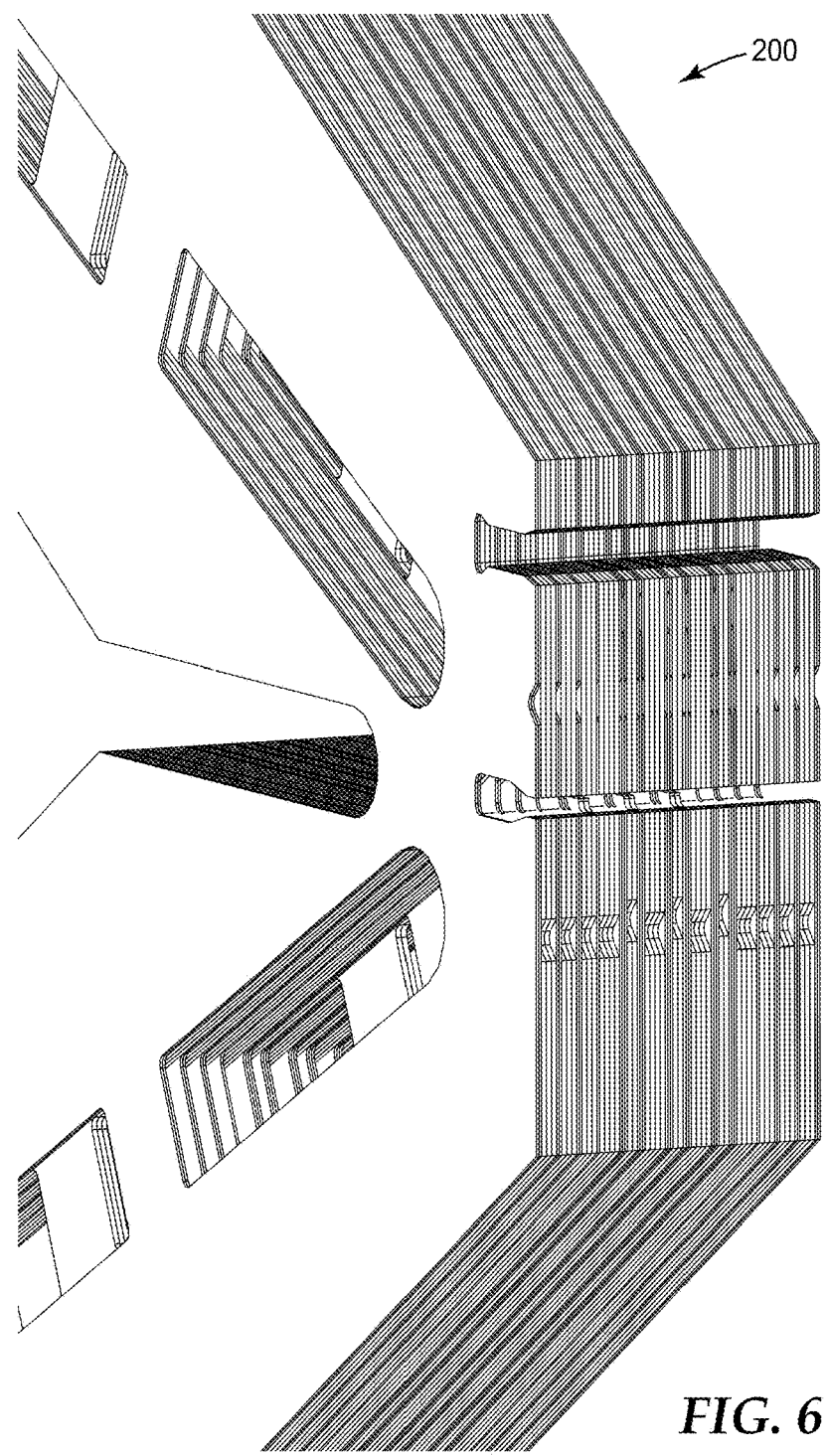
FIG. 6 is a perspective assembly drawing of several different sequences of shims employing the shims of FIGS. 2-5 so as to be able to produce the film article of FIG. 1.

Shim 4540 has several holes 47 to allow the passage of, for example, bolts to hold shim 4540 and others to be described below into an assembly. Shim 4540 has dispensing opening 4566 in dispensing surface 4567. Dispensing opening 4566 may be more clearly seen in the expanded view shown in FIG. 2A. It might seem that there is no path from cavity 4562b to dispensing opening 4566, via, for example, passageway 4568b, but the flow has a route in the perpendicular-to-the-plane-of-the-drawing dimension when the sequence of FIG. 6 is completely assembled. In the illustrated embodiment, dispensing surface 4567 has indexing groove 4580 which can receive an appropriately shaped key to facilitate assembling diverse shims into a die. The shim may also have identification notch 4582 to help verify that the die has been assembled in the desired manner. This embodiment of the shim has shoulders 4590 and 4592, which these can assist in mounting the assembled die in a manner which will be made clear below in connection with FIG. 9.

Referring now to FIG. 3, a plan view of shim 4640 is illustrated. Shim 4640 has first aperture 4660a, second aperture 4660b, and third aperture 4660c. When shim 4640 is assembled with others as shown in FIG. 9, aperture 4660a will help define second cavity 4562a, aperture 4660b will help define first cavity 4562b, and aperture 4660c will help define third cavity 4562c. Analogous to shim 4540, shim 4640 has dispensing surface 4667, and in this particular embodiment, dispensing surface 4667 has indexing groove 4680 and an identification notch 4682. Also analogous to shim 4540, shim 4640 shoulders 4690 and 4692. It might seem that there is no path from cavity 4562a to dispensing orifice 4666, via, for example, passageway 4668a, but the flow has a route in the perpendicular-to-the-plane-of-the-drawing dimension when the sequence of FIG. 6 is completely assembled. Dispensing opening 4666 may be more clearly seen in the expanded view shown in FIG. 3A.

Referring now to FIG. 4, a plan view of shim 4740 is illustrated. Shim 4740 has first aperture 4760a, second aperture 4760b, and third aperture 4760c. When shim 4740 is assembled with others as shown in FIG. 9, aperture 4760a will help define second cavity 4562a, aperture 4760b will help define first cavity 4562b, and aperture 4760c will help define third cavity 4562c. Analogous to shim 4540, shim 4740 has dispensing surface 4767, and in this particular embodiment, dispensing surface 4767 has indexing groove 4780 and identification notch 4782. Also analogous to shim 4540, shim 4740 has shoulders 4790 and 4792. Shim 4740 has dispensing opening 4766, but it will be noted that this shim has no connection between dispensing opening 4766 and any of the cavities 4562a, 4562b, or 4562c. As will be appreciated more completely in the discussion below, in some of the positions where shim 4740 appears, blind recess 4794 behind dispensing orifice 4766 helps shape the flow of material from cavity 4562a into a sheath around the core provided by second polymeric composition emerging from shim 4840. Blind recess 4794 and dispensing orifice 4766 may be more clearly seen in the expanded view shown in FIG. 4A. In other positions where shim 4740 appears, it serves to manipulate the resistance of the dispensing slot within a region to extruded flow. This will also be discussed in more detail below.

Figure 5A:
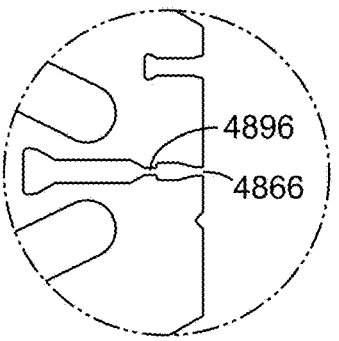

Referring now to FIG. 5, a plan view of shim 4840 is illustrated. Shim 4840 has first aperture, 4860a, second aperture 4860b, and third aperture 4860c. When shim 4840 is assembled with others as shown in FIG. 9, aperture 4860a will help define second cavity 4562a, aperture 4860b will help define first cavity 4562b, and aperture 4860c will help define third cavity 4562c. Analogous to shim 4540, shim 4840 has dispensing surface 4867, and in this particular embodiment, dispensing surface 4867 has indexing groove 4880 and identification notch 4882. Also analogous to shim 4540, shim 4840 has shoulders 4890 and 4892. It might seem that there is no path from cavity 4562c to dispensing orifice 4866, via, for example, passageway 4868c, but the flow has a route in the perpendicular-to-the-plane-of-the-drawing dimension when the sequence of FIG. 6 is completely assembled. It will be noted that passageway 4868c includes constriction 4896 upstream from dispensing orifice 4866, which may be more clearly seen in the expanded view of FIG. 5A. It will be appreciated in connection with FIG. 8 that constriction 4896 helps the sheath to completely surround the core of the emerging strand.

Figure 7:
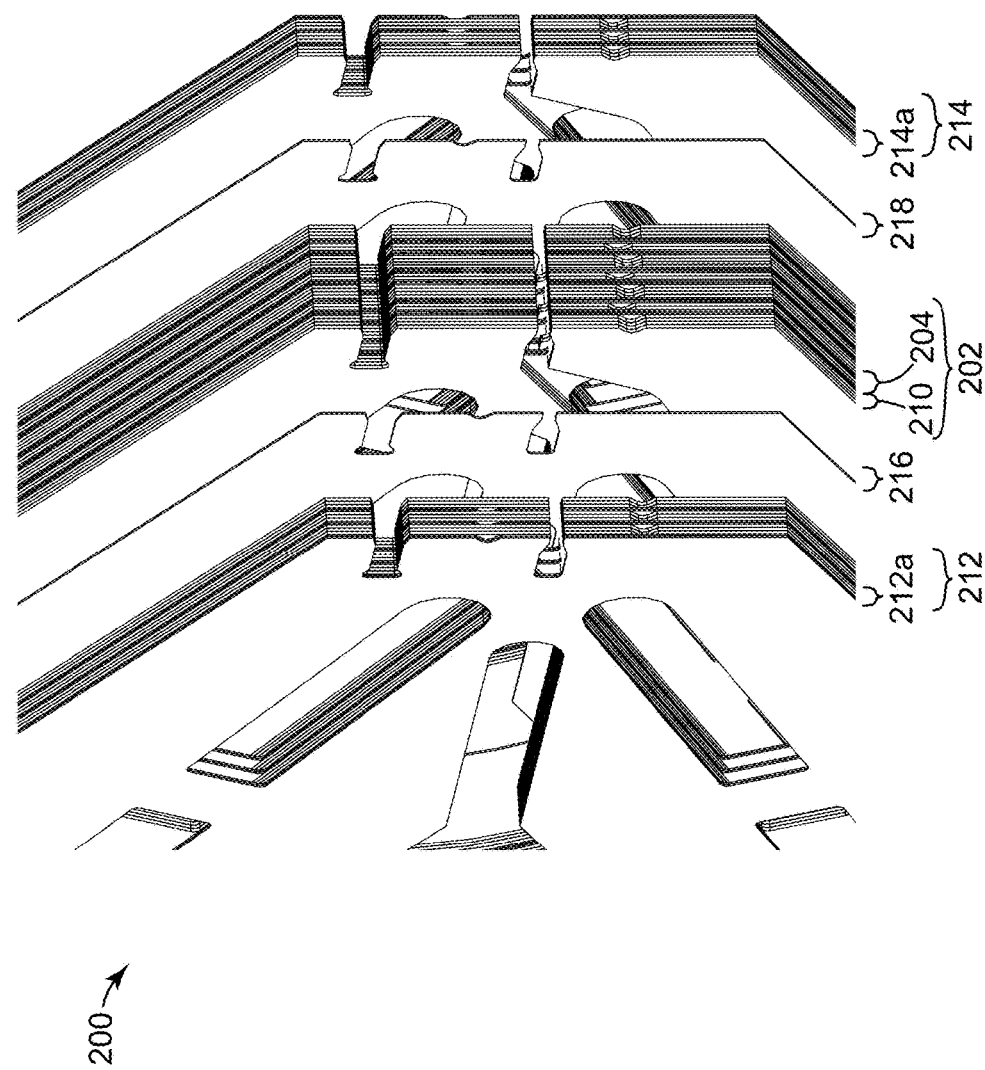
FIG. 7 is a partially exploded perspective view where the several different sequences of shims shown together in FIG. 6 are shown separated into the sequences that produce the several regions discussed in connection with FIG. 1.

Referring now to FIG. 6, a perspective assembly drawing of a several different repeating sequences of shims, collectively 200, employing the shims of FIGS. 2-5 so as to be able to produce the film article 100 of FIG. 1, is shown. It should be noted in FIG. 6 that the dispensing slot, formed by the dispensing openings 4566, 4666, 4766, and 4866 collectively in the plurality of shims, is a continuous opening across the die. There are no shims without dispensing openings, which would form breaks to cause the extruded polymeric compositions to form into separated strands. Referring now to FIG. 7, the several different repeating sequences of shims shown together in FIG. 6 are shown separated into the sequences that produce the several regions discussed above in connection with FIG. 1. More particularly, and proceeding left to right, die zone 212 comprises three instances of a repeating sequence of four shims 212a that can extrude ribbon region 112. Die zone 216 includes one instance of one shim. Die zone 202 includes four instances of a repeating sequence of four shims 210 that can extrude stripes 110. Interspersed with repeating sequences of four shims 210 are three instances of a repeating sequence 204 of eight shims that can extrude strands 104. Die zone 218 includes one instance of one shim. Finally die zone 214 comprises three instances of a repeating sequence of four shims 214a that can extrude ribbon region 114. Die zones 212, 216, 218, and 214 and consequently ribbon regions 112 and 114 and weld lines 116 and 118 are optional.

In the repeating sequence of four shims 212a that can extrude ribbon region 112, three instances of shim 4540

(shown in FIG. 2) followed by one shim 4740 (shown in FIG. 4) provide the total of four shims. Shims 4540 provide flow from first cavity 4562b through passageways 4568b to the dispensing slot formed by dispensing openings 4566 in the shims 4540. Blind recess 4794 in shim 4740 allows the first polymeric composition to be dispensed from dispensing opening 4766, but shim 4740 serves to restrict the flow of the first polymeric composition in the die zone 212 useful for making the ribbon region 112 because it is not connected to second cavity 4562b. The result is a reduction in caliper of the film in the portions of the ribbon region that are extruded from dispensing opening 4766. A schematic illustration of the restriction in flow is shown in FIG. 11.

Figure 11:
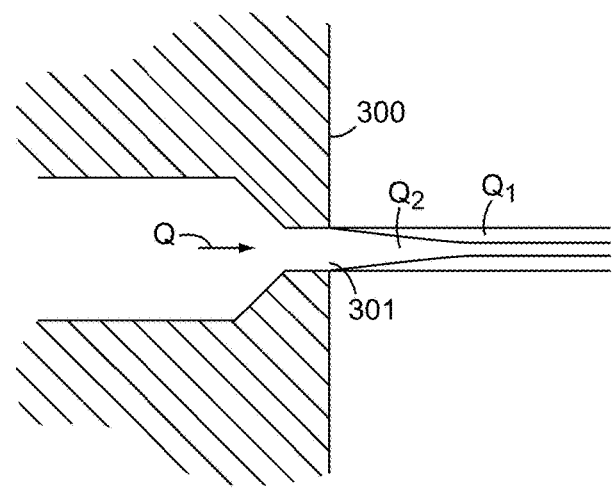
FIG. 11 is a schematic illustration of the flow restriction observed for some embodiments of the method according to the present disclosure.

In FIG. 11, Q represents the polymer flow from the dispensing surface 300 of a sequence of shims useful for practicing the method and apparatus disclosed herein. $Q_1$ and $Q_2$ represent the polymer flows through dispensing orifice 301 when different sequences of shims are used. The sequence of shims providing polymer flow $Q_2$ has more spacer shims 4740 than the sequence of shims providing polymer flow $Q_1$. This result is that $Q_2$ is less than $Q_1$, and a reduction in caliper of the film results. This reduction in caliper may be almost imperceptible in the extruded film article but may be observed upon stretching the ribbon region 112 in the cross-machine direction, particularly when there is a pigment or whitening agent in the first polymeric composition. Flow of the first polymeric composition to the ribbon regions may be altered by changing the number of shims 4540 and/or the number of shims 4740 in the repeating sequence of shims, and the differences in caliper in the ribbon region may become more pronounced if the number of shims 4740 used in the repeating sequence of shims is increased. Other ways of controlling the caliper of the film in the ribbon region are also possible. For example, the thickness of the dispensing slot in the ribbon region, the pressure of in cavity 4562b, and the selection of the polymeric composition may all affect the caliper of the ribbon region. It may be useful for the film in the ribbon region to be thicker immediately adjacent the weld lines (116 and 118 shown in FIG. 1).

Figure 8:
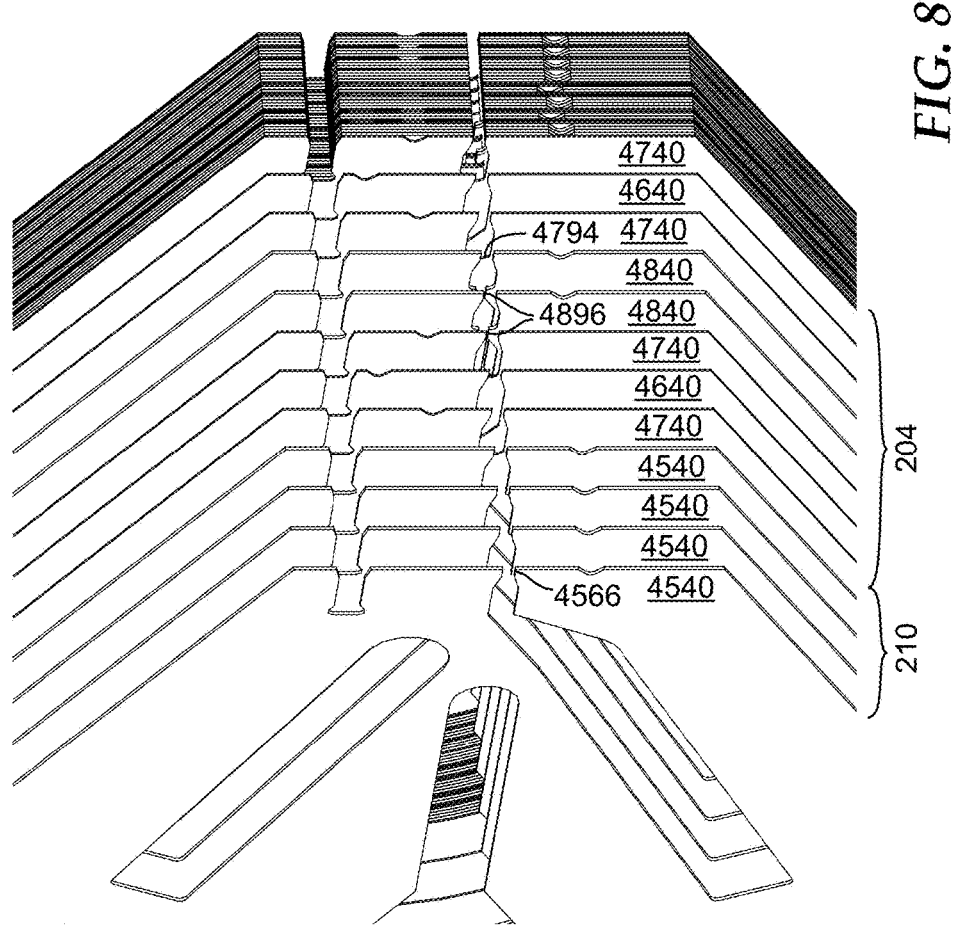
FIG. 8 is a perspective view of the some of the sequence of shims of FIG. 7, further exploded to reveal some individual shims.
Figure 9:
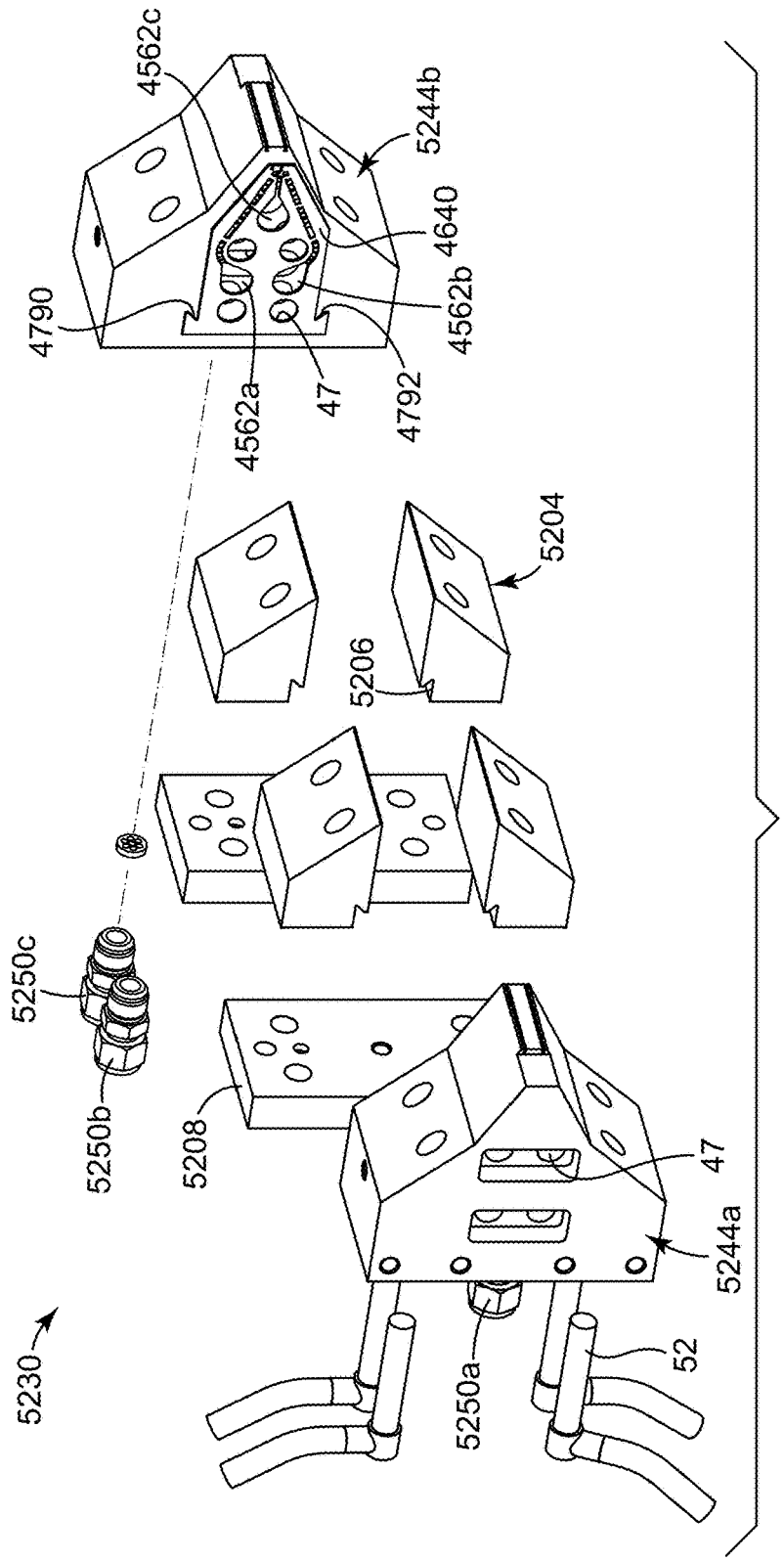
FIG. 9 is an exploded perspective view of an exemplary mount suitable for an extrusion die composed of multiple repeats of the sequence of shims of FIG. 6.

Referring now to FIG. 8, a perspective view of die zones 210 and 204 of FIG. 7 is further exploded to reveal some individual shims. More particularly, die zone 210 is more clearly shown to comprise four instances of shim 4540. Further, die zone 204 is more clearly shown to comprise one instance of shim 4740, one instance of shim 4640, one instance of shim 4740, two instances of shim 4840, one instance of shim 4740, one instance of shim 4640, and one instance of shim 4740, making eight shims total. In this view, it is easier to appreciate how the strand 104 (seen in FIG. 1) is formed. Referring again to FIG. 5, the presence of constriction 4896 on the two instances of shim 4840 allows the inflows along passageways 4668a to have a dimension larger than passageway 4868c at the point where passageway 4868c enters the dispensing slot. Referring again to FIGS. 3 and 4, blind recesses 4794 on the two instances of shim 4740 cooperate to allow the inflows from along passages 4668a on the two instances of shim 4640 to envelop the inflow from the passages 4868c on the two instances of shim 4840, resulting in an strand 104 with sheath 108 around core 106 (seen in FIG. 1). The strand 104, which includes relatively elastic core 106, is bonded to a relatively less elastic stripe 110 (seen in FIG. 1), which emerges from dispensing openings 4566 in the four instances of shim 4540.

Referring now to FIG. 9, an exploded perspective view of a mount 5230 suitable for an extrusion die composed of multiple repeats of sequences of shims of FIG. 6 is illustrated. Mount 5230 is particularly adapted to use shims 4540, 4640, 4740 and 4840 as shown in FIGS. 2 through 8. However for visual clarity, only a single instance of shim 4640 is shown in FIG. 9. The multiple repeats of sequences of shims of FIG. 6 are compressed between two end blocks 5244a and 5244b. Conveniently, through bolts can be used to assemble the shims to the end blocks 5244a and 5244b, passing through holes 47 in shims 4540, 4640, 4670, and 4680.

In this embodiment, inlet fittings 5250a, 5250b, and 5250c provide a flow path for three streams of molten polymer through end blocks 5244a and 5244b to cavities 4562a, 4562b, and 4562c. Compression blocks 5204 have a notch 5206 that conveniently engages the shoulders on the shims (e.g., 4690 and 4692 on 4640). When mount 5230 is completely assembled, compression blocks 5204 are attached by, e.g. machine bolts to backplates 5208. Holes are conveniently provided in the assembly for the insertion of cartridge heaters 52.

Figure 10:
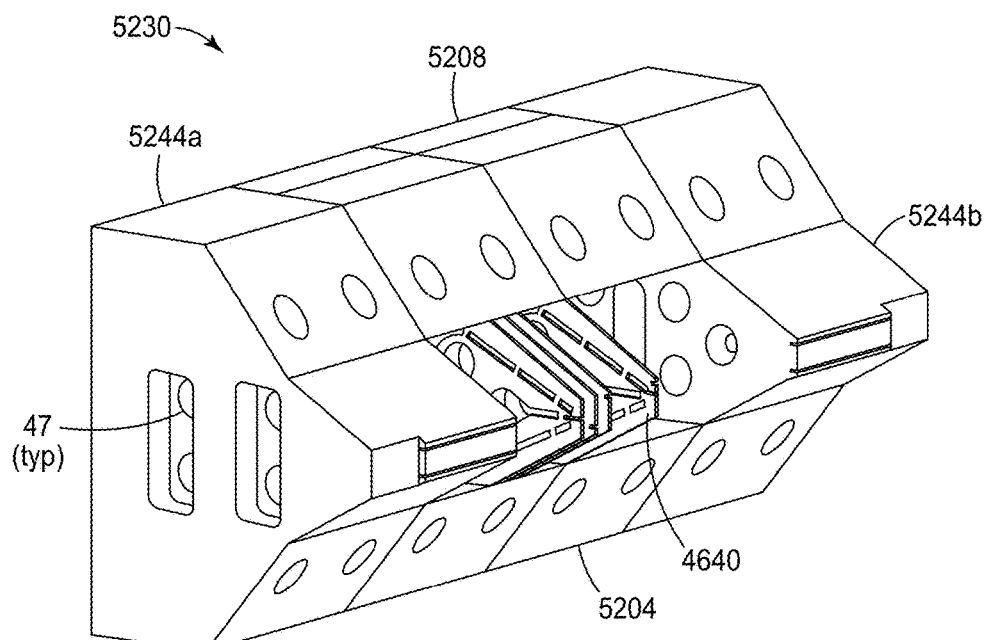
FIG. 10 is a perspective view of the mount of FIG. 9 in an assembled state.

Referring now to FIG. 10, a perspective view of mount 5230 of FIG. 9 is illustrated in a partially assembled state. A few shims (e.g., 4640) are in their assembled positions to show how they fit within mount 5230, but most of the shims that would make up an assembled die have been omitted for visual clarity.

While each of FIGS. 2 to 10 illustrate an apparatus for extrusion that includes a plurality of shims, it is also envisioned that an extrusion die could be machined to have the same first, second, and third passageways from first, second, and third cavities without using a plurality of shims. The passageways may be machined into various regions of a die or into blocks, for example, that can be assembled to make a die. Such blocks can have thicknesses of up to about 5 centimeters or more. Any of these constructions may be useful for making the films disclosed herein.

The extrusion die according to the present disclosure may also be useful for making a variety of film constructions including, for example, three or more different polymeric compositions. A variety of different polymeric compositions may be selected to provide stripes in an alternating arrangement with core/sheath strands where the stripes, core, and sheath are each made, for example, from different polymeric compositions. The different polymeric compositions may be selected for their surface properties or their bulk properties (e.g., tensile strength, elasticity, color, etc). Furthermore, polymeric compositions can be selected to provide specific functional or aesthetic properties in the extruded article such as elasticity, softness, hardness, stiffness, bendability, roughness, colors, textures, or patterns.

The extrusion die disclosed herein is also useful, for example, for making film constructions including two different polymeric compositions. In some embodiments, the same polymeric composition may be in two different cavities. For example, in the apparatus illustrated in FIGS. 2 to 10, the same polymeric composition may be used in both cavities 4562a and 4562b to provide a film in which the cores 106 of strands 104 are made from one polymeric composition and the sheaths 108 of strands 104 and the stripes 110 are made from another polymeric composition. Using this die and method, a film may be made that has stripes of a first polymeric composition alternating with strands of, for example, a third polymeric composition, wherein the strands are encapsulated by the first polymeric composition such that the third polymeric composition is not exposed on at least one major surface (or both major surfaces) of the film. In these embodiments in which the stripes and the sheath are made from the same polymeric composition, it is typically still possible to detect a boundary between the sheath and the stripes because of the different flow velocities in the flow channels for the stripes and the sheath. The flow velocity for the sheath is typically much lower than that of the stripes because of the smaller size of the flow channels for the sheath (e.g., formed by shims 4640 and 4740 shown in FIG. 8) relative to the flow channels for the stripes (e.g., formed by shims 4540 shown in FIG. 8). The sheath material typically accelerates more at the dispensing opening causing it to have more molecular orientation, and as a result, a higher degree of birefringence as described above, than the stripes. Thus, there is typically a difference in molecular orientation between the sheath and the stripes that can be detected by measuring birefringence. Depending on the length of time the sheath and the stripes are allowed to remain in the molten state after they are merged, a weld line is formed between the sheath and the stripes. A weld line between the sheath and the stripes in the film according to and/or made according to the present disclosure is typically visible, for example, when the film is stretched in a direction transverse to the strands and stripes.

Films having alternating strands of one polymeric composition and stripes of another polymeric composition may also be made by other extrusion dies that comprise a plurality of shims and have two cavities for molten polymer, such as those dies described, for example, in Int. Pat. App. Pub. No. WO 2011/119323 (Ausen et al.).

A variety of polymeric compositions are useful for practicing the present disclosure. The mass flow (or volume flow) of the different polymeric compositions can be equal or unequal as they are respectively extruded. In some embodiments, it is desirable for the melt strengths of the different polymeric compositions to be similar. Polymeric compositions useful for the cores, sheaths, and stripes may be selected, for example, based on their compatibility and mutual adhesion properties.

In some embodiments, the polymeric compositions that may be extruded in the die disclosed herein are thermoplastic polymeric compositions (e.g., polyolefins (e.g., polypropylene, polypropylene copolymers, polyethylene, and polyethylene copolymers), polyvinyl chloride, polystyrenes and polystyrene block copolymers, nylons, polyesters (e.g., polyethylene terephthalate), polyurethanes, polyacrylates, silicone polymers, and copolymers and blends thereof). However, the die and method according to the present disclosure may also be useful for co-extruding polymeric materials that can be crosslinked (e.g., by heat or radiation). When a heat curable resin is used, the die can be heated to start the cure so as to adjust the viscosity of the polymeric material and/or the pressure in the corresponding die cavity.

The stripes in a film according to and/or made according to the present disclosure are typically made from a first polymeric composition. In some embodiments, any combination of the sheaths, the stripes, or the ribbon region are made from the first polymeric composition. The first polymeric composition in the films according to the present disclosure can be relatively less elastic than the polymeric composition from which the cores are made. The first polymeric composition can also be inelastic as defined above. The first polymeric composition can be formed, for example, of semicrystalline or amorphous polymers or blends. Inelastic polymers can be polyolefinic, formed predominantly of polymers such as polyethylene, polyethylene copolymers, polypropylene, polypropylene copolymers, polybutylene, or polyethylene-polypropylene copolymers. In some embodiments, the first polymeric composition comprises polypropylene, polyethylene, polypropylene-polyethylene copolymer, or blends thereof.

In the films according to and/or made according to the present disclosure, the polymeric composition used for the cores of the strands is relatively more elastic than the first polymeric composition described above. In some embodiments, the stripes are made from a first polymeric composition, the sheath is made from a second polymeric composition, and the core is made from a third polymeric composition that is more elastic than either the first or second polymeric composition. Examples of elastic polymeric compositions useful for the core of the strands include thermoplastic elastomers such as ABA block copolymers, polyurethane elastomers, polyolefin elastomers (e.g., metallocene polyolefin elastomers), olefin block copolymers, polyamide elastomers, ethylene vinyl acetate elastomers, and polyester elastomers. An ABA block copolymer elastomer generally is one where the A blocks are polystyrenic, and the B blocks are conjugated dienes (e.g., lower alkylene dienes). The A block is generally formed predominantly of substituted (e.g, alkylated) or unsubstituted styrenic moieties (e.g., polystyrene, poly(alphamethylstyrene), or poly (t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastic polymers can be blended with block copolymer elastomers, and various elastic polymers may be blended to have varying degrees of elastic properties.

Many types of thermoplastic elastomers are commercially available, including those from BASF, Florham Park, N.J., under the trade designation "STYROFLEX", from Kraton Polymers, Houston, Tex., under the trade designation "KRATON", from Dow Chemical, Midland, Mich., under the trade designation "PELLETHANE", "INFUSE", VERSIFY", or "NORDEL", from DSM, Heerlen, Netherlands, under the trade designation "ARNITEL", from E. I. duPont de Nemours and Company, Wilmington, Del., under the trade designation "HYTREL", from ExxonMobil, Irving, Tex. under the trade designation "VISTAMAXX", and more.

In embodiments of the film or method disclosed herein that include a first polymeric composition, a second polymeric composition, and a third polymeric composition, blending may be useful for making a second polymeric composition that is relatively more elastic than the first polymeric composition but relatively less elastic than the third polymeric composition from which the cores are made. In some embodiments, the second polymeric composition comprises a blend of the first polymeric composition and the third polymeric composition. In these embodiments, the second polymeric composition generally has good compatibility with and good adhesion to both the first polymeric composition and the third polymeric composition. This allows the second polymeric composition to serve as an effective tie layer between the stripes and the strand cores without the use of other compatibilizers such as those described in U.S. Pat. No. 6,669,887 (Hilston et al.). However, in some embodiments, compatibilizers added to at least one of the second or third polymeric compositions may be useful. Examples of useful compatibilizers can be found in U.S. Pat. No. 4,787,897 (Torimae et al.) and U.S. Pat. No. 6,669,887 (Hilston et al.).

The polymeric composition for making the cores may be selected such that a film of the core polymeric composition (such as a film that is 0.002 mm to 0.5 mm thick) has an elongation of at least 200 percent at room temperature. The polymeric composition for making the sheath, for example, when it is different from the first polymeric composition, may be selected such that a film (e.g., 0.002 mm to 0.5 mm thick) of the sheath polymeric composition, which may be a blend of polymers, has an elongation of at least 5% at room temperature. In some embodiments, the polymeric composition may be selected for the cores, sheaths, and the stripes such that the force required to stretch the strand in the cross-machine direction is less that the force required to stretch the stripes.

In embodiments of the film or method disclosed herein that include a first polymeric composition, a second polymeric composition, and a third polymeric composition, the second polymeric composition may advantageously be less tacky than the third polymeric composition and softer than the first polymeric composition. When the second polymeric composition that is softer than the first polymeric composition is exposed on at least one of the major surfaces of the film disclosed herein, the force required to initially stretch the film in the direction transverse to the strands and stripes may be less than when elastic strands are totally encompassed within a relatively inelastic matrix. For example, as shown in Examples 1 and 3, the initial load at 50% elongation in a film having second polymeric composition comprising a mixture of an elastic resin and polypropylene (Example 1) was lower than the initial load at 50% elongation in a film having a second polymeric composition comprising polypropylene resin (Example 2).

In some embodiments, polymeric materials used to make films described herein may comprise a colorant (e.g., pigment and/or dye) for functional (e.g., optical effects) and/or aesthetic purposes (e.g., each has different color/shade). Suitable colorants are those known in the art for use in various polymeric compositions. Examples of colors imparted by the colorant include white, black, red, pink, orange, yellow, green, aqua, purple, and blue. In some embodiments, it is desirable level to have a certain degree of opacity for one or more of the polymeric compositions. The amount of colorant(s) to be used in specific embodiments can be readily determined by those skilled in the art (e.g., to achieve desired color, tone, opacity, transmissivity, etc.). The polymeric compositions such as the first, second, and third polymeric compositions may be formulated to have the same or different colors. In some embodiments, the stripes and at least portions of the strands are different colors. In some of these embodiments, the cores and the stripes are different colors. In some embodiments, each of the cores, the sheaths, and the stripes are different colors.

In some embodiments, the stripes include apertures, which may be useful, for example, for increasing the breathability of the film or film article. In some embodiments, the ribbon regions also include apertures. Apertures can be made in the stripes and/or ribbon regions of the film or film article by a variety of methods including needle-punching, laser techniques, or other methods to introduce apertures into the film after it is extruded.

Films disclosed herein and extensible regions of film articles disclosed herein are typically extensible in the cross-machine direction (which is typically transverse to the direction of the strands and stripes), and less extensible in the machine direction. In some embodiments, the film disclosed herein or extensible region of the film article disclosed herein has an elongation of at least 75 (in some embodiments, at least 100, 200, 250, or 300) percent and up to 1000 (in some embodiments, up to 750 or 500) percent). In some embodiments, films disclosed herein and extensible regions of film articles disclosed herein will sustain only small permanent set following deformation and relaxation (in some embodiments, less than 25, 20, or even less than 10 percent) of the original length after 100% elongation at room temperature. As used herein, elongation and permanent set are determined using the test method described in the Examples, below.

In some embodiments, the films and/or film articles described herein have strands with widths up to 750 micrometers (in some embodiments, up to 650 micrometers, 500 micrometers, or 400 micrometers). The width of the strand is typically at least 100 micrometers (in some embodiments, at least 150 micrometers or 200 micrometers). For example, the strands may be in a range from 100 micrometers to 750 micrometers, 150 micrometers to 750 micrometers, 150 micrometers to 500 micrometers, or 200 micrometers to 600 micrometers wide.

In any of these embodiments where the strand has a core and a sheath, the sheath may be in a range from 2 micrometers to 20 micrometers, from 3 micrometers to 15 micrometers, or from 5 micrometers to 10 micrometers thick. As mentioned above, the sheath may not completely surround the core in some embodiments. Sheaths having these dimensions may be useful, for example, to allow facile elongation of the film according to the present disclosure or the extensible region of the film article according to the present disclosure. The thickness of the sheath may be understood to be the distance from the center of the strand to the outer perimeter of the sheath minus the distance from the center of the strand to the inner perimeter of the sheath as measured at the film surface. In some cases, the sheath may be thicker in the interior of the film than at the surface.

In some embodiments, the films and/or film articles described herein have stripes with widths up to 2 millimeters (mm) (in some embodiments, up to 1.5 mm, 1 mm or 750 micrometers). In some embodiments, the stripes are at least 250 micrometers, 350 micrometers, 400 micrometers, or 500 micrometers wide. For example, the stripes may be in a range from 250 micrometers to 1.5 mm, 250 micrometers to 1 mm, or 350 micrometers to 1 mm wide. As used herein, the width of the stripes or the strands is the dimension measured in the cross-direction of the film.

In some embodiments of the film or film article disclosed herein, the distance between midpoints of two stripes separated by one strand is up to 3 mm, 2.5 mm, or 2 mm. In some embodiments, the distance between midpoints of two stripes separated by one strand is at least 300 micrometers, 350 micrometers, 400 micrometers, 450 micrometers, or 500 micrometers. In some embodiments, the distance between midpoints of two stripes separated by one strand is in a range from 300 micrometers to 3 mm, 400 micrometers to 3 mm, 500 micrometers to 3 mm, 400 micrometers to 2.5 mm, or 400 micrometers to 2 mm.

In some embodiments, when the method according to the present disclosure is used to make a film having strands and stripes with widths in these ranges, the film can reliably be made at unexpectedly fast line speeds. For example, as described in Examples 6 and 7, below, at 10 lbs/inch/hour (10.7 kg/cm/hour), a film according to the present disclosure that was 12 micrometers thick was prepared at 300 feet per minute (91 meters per minute) or 400 feet per minute (122 meters per minute). In some embodiments, methods according to the present disclosure can be useful for making films disclosed herein at line speeds of up to 450 feet per minute (137 meters per minute). In contrast, as described in the Comparative Example, below, using a method described in Example 1 of Int. Pat. App. Pub. No. WO 2011/119323 (Ausen et al.), which uses an extrusion die that comprises a plurality of shims and has two cavities for molten polymer, a film have lane widths of 40 micrometers and 200 micrometers of a thermoplastic elastomer and a polypropylene, respectively, could be made at a line speed of only up to 15 feet per minute (4.6 meters per minute) before reaching the maximum die pressure of 4500 psi (31 megapascals). Furthermore, strands greater than 750 micrometers in width are more likely to neck down upon elongation of the film or extensible region, resulting in a scalloped edge on the strand.

A variety of thicknesses may be useful for the films and film articles disclosed herein. As used herein, the thickness of the film, stripes, or strands is the dimension measured in the "z" direction perpendicular to the machine direction "y" and the cross-direction "x" of the film. In some embodiments, the film may be up to about 250 micrometers, 200 micrometers, 150 micrometers, or 100 micrometers thick. In some embodiments, the film may be at least about 10 micrometers, 25 micrometers, or 50 micrometers thick. For example, the thickness of the film may be in a range from 10 micrometers to 250 micrometers, from 10 micrometers to 150 micrometers, or from 25 micrometers to 100 micrometers thick. In some embodiments, the thickness of the stripes is within about 20%, 10%, or 5% of the thickness of the strands. In these cases, the stripes may be said to have substantially the same thickness as the strands. This may be useful, for example, for lowering the force to initially stretch the film, to maximize the elongation, and to lower the hysteresis of the film. In other embodiments, the thickness of the strands may be at least 50%, 100%, 150%, or more higher than the stripes. This may be useful, for example, to provide a pleasing tactile ribbed texture to the film surface or to make a film in which plastic deformation of the stripes is desired and to make a dead stop film, as further described below, in which the load rises rapidly at the end of the elastic region. The melt viscosities of the selected resins influence the thicknesses of the strands and the stripes. Resins may be selected for their melt viscosities, or, in some embodiments, a tackifier or other viscosity-reducing additive may be useful to decrease the melt viscosity of the resin, for example, the third polymeric composition.

In some embodiments of the films and extensible regions of film articles disclosed herein, the density of the strands can vary across the web. This can be accomplished, for example, if sequences of shims in the die described herein include varying number of shims providing strands. In some embodiments, it may be desirable to have a higher density of strands toward the center of the film. In other words, the distance between midpoints of successive stripes may or may not be identical. Measuring the distance between midpoints between successive stripes is convenient; however, distance could also be measured between any point of one stripe to a corresponding point in the next stripe of the film. In some embodiments, across a film there is an average of distances between midpoints of two stripes separated by one strand, and for any two given stripes separated by one strand, the distance is within 20 (in some embodiments, 15, 10, or 5) percent of the average of these distances across the film.

Measurements of the widths and/or thicknesses of strands (e.g., including the core and the sheath in some embodiments) or stripes or distances between two corresponding points on successive stripes or strands may be made, for example, by optical microscopy. Optical microscopy is also useful to determine volume percentage of the stripes and strands. In some embodiments, the first stripes make up a higher volume percentage than the strands. In some embodiments, the stripes make up a range of about 51% to 85% of the volume of the film, and the strands make up a range of about 15% to 49% of the volume of the film. In some embodiments, the stripes make up a range of about 55% to 80% of the volume of the film, and the strands make up a range of about 20% to 45% of the volume of the film.

Films and film articles according to and/or prepared using the method according to the present disclosure can be made with a variety of basis weights. For example, the basis weight of the film or film article may be in a range from 15 grams per square meter to 100 grams per square meter. In some embodiments, the basis weight of the film or film article is in a range from 20 grams per square meter to 80 grams per square meter. It is useful that in these films and film articles, elastomeric polymers can make a relatively low contribution to the basis weight and yet useful elastic properties are achieved in the films and film articles. In some embodiments, the elastomeric polymers contribute up to 25, 20, 15, or 10 grams per square meter to the basis weight of the film. In some embodiments, elastomeric polymers contribute in a range from 5 to 10 grams per square meter to the basis weight of the film. The typically low amount of elastomeric polymer in the films and film articles described herein provides a cost advantage over elastic films in which elastomeric polymers make a higher contribution to the basis weight of the films.

In some embodiments of the films and extensible regions of film articles disclosed herein, the stripes have molecular orientation resulting from stretching. In some of these embodiments, the stripes have stretch-induced molecular orientation in a direction transverse to the stripes caused by permanent plastic deformation. To achieve the permanent deformation, the film may be stretched to at least 500 (in some embodiments, at least 600 or 750) percent, depending on the elongation of the film. In these embodiments, the films or extensible regions of the film articles disclosed herein can provide a "dead-stop" elastic film, in which the force required for extension rises rapidly during the last portion of extension.

Figure 12:
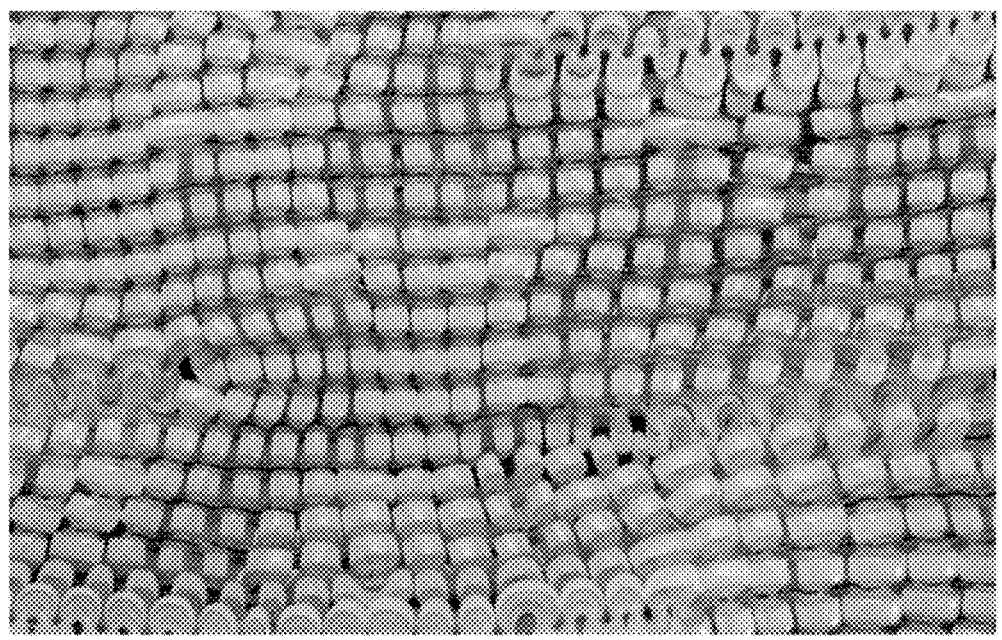
FIG. 12 is photomicrograph of a surface of an exemplary film after stretching in the machine direction.

In some embodiments, the films disclosed herein are stretched-activated in the direction of the stripes. When the elastic strands relax after stretching, the stretched stripes are shirred to form a textured surface. FIG. 12 is a digital optical image at 30× of an exemplary film stretch-activated in this manner. Such texture may eliminate the need for laminating the elastic film to a fibrous (e.g., nonwoven) carrier, especially if soft-feeling resins are used to make the film. Accordingly, in some embodiments, the film disclosed herein is not joined to a carrier.

In some embodiments where the film or film article disclosed herein is not joined to a carrier, particles may be applied to one or both major surfaces of the film to provide a matte finish. In some embodiments, the film or film article disclosed herein may be flocked with a fibrous material, such as any of those described below, to give the film a soft feeling without joining it to a carrier. In other embodiments, pattern-embossing the film or film article on one or both major surfaces can provide an appearance or feeling of a fibrous material.

In laminates according to the present disclosure, the film disclosed herein is joined to a carrier. The method disclosed herein further comprises joining a surface of the film to a carrier. The film may be joined to a carrier, for example, by lamination (e.g., extrusion lamination), adhesives (e.g., pressure sensitive adhesives), or other bonding methods (e.g., ultrasonic bonding, thermal bonding, compression bonding, or surface bonding).

The film and the carrier may be substantially continuously bonded or intermittently bonded. "Substantially continuously bonded" refers to being bonded without interruption in space or pattern. Substantially continuously bonded laminates can be formed by laminating a carrier to a substantially continuous film upon extrusion of the film; passing the film and the fibrous web between a heated smooth surfaced roll nip if at least one of them is thermally bondable; or applying a substantially continuous adhesive coating or spray to one of the film or carrier before bringing it in contact with the other of the film or carrier. "Intermittently bonded" can mean not continuously bonded and refers to the film and the carrier being bonded to one another at discrete spaced apart locations or being substantially unbonded to one another in discrete, spaced apart areas. Intermittently bonded laminates can be formed, for example, by passing the film and the carrier through a heated patterned embossing roll nip if at least one of them is heat bondable, or by applying discrete, spaced apart areas of adhesive to one of the film or the carrier before bringing it into contact with the other of the film or the carrier. An intermittently bonded laminate can also be made by feeding an adhesively coated aperture ply or scrim between the film and the carrier.

In some embodiments, the chemical compositions in the stripes and the strands differ at the surface of the film. The ability to select different compositions for the sheath or strand and the stripes offers the ability to bond selectively to either the strand or the stripes as desired. In some embodiments, if a portion of the third polymeric composition is exposed at the top or bottom surface of the film and is tacky, the carrier may be joined to the exposed third polymeric composition. In other embodiments, the carrier is bonded predominantly to the stripes. When a carrier is said to bond predominantly to either the stripes or the strands, it means that greater than 50, 60, 75, or 90 percent of the bonded area of the film is found in one of these locations but not in the other. Bonding predominantly to the stripes can be achieved, for example, through the selected materials for the stripes and sheath, through the geometry of the stripes and strands, or a combination of these. The first polymeric composition may be selected, for example, to have a similar chemical composition and/or molecular weight as the carrier to be bonded. Matching chemical composition and/or molecular weight for the bonding of two materials may be useful, for example, for thermal bonding, ultrasonic bonding, and compression bonding methods among others. The blending of plastomers or polyethylene into the stripes and leaving the sheath comprised predominately of polypropylene, for example, may also be useful, for example, for lowering the melting point and making the stripes preferentially thermally bondable. An additive to the sheath could be used to make it less receptive to bonding. For example, extrudable release materials, or lower surface energy materials than the other surface, could be employed. The ability to preferentially bond to either the stripes or the strands using selection of materials is not possible in films, for example, in which multiple strands of one polymer are embedded within a continuous matrix of another polymer.

Bonding a carrier selectively to either the strands or the stripes of a film according to the present disclosure can also be controlled by altering the geometry of the film. Selection of resins with various die swells can lead to different thicknesses of the stripes and strands. Die designs that produce varying thicknesses of the film (e.g., by having a different dispensing orifice) may also be useful. The stripes can be made thicker than the strands or vice versa. In a lamination, the carrier is more likely to bond to the thicker of the stripes or strands.

In laminates according to the present disclosure, the carrier may comprise a variety of suitable materials including woven webs, non-woven webs (e.g., spunbond webs, spunlaced webs, airlaid webs, meltblown web, and bonded carded webs), textiles, nets, and combinations thereof. In some embodiments, the carrier is a fibrous material (e.g., a woven, nonwoven, or knit material). The term "nonwoven" when referring to a carrier or web means having a structure of individual fibers or threads which are interlaid, but not in an identifiable manner as in a knitted fabric. Nonwoven fabrics or webs can be formed from various processes such as meltblowing processes, spunbonding processes, spunlacing processes, and bonded carded web processes. In some embodiments, the carrier comprises multiple layers of nonwoven materials with, for example, at least one layer of a meltblown nonwoven and at least one layer of a spunbonded nonwoven, or any other suitable combination of nonwoven materials. For example, the carrier may be a spunbond-meltbond-spunbond, spunbond-spunbond, or spunbond-spunbond-spunbond multilayer material. Or, the carrier may be a composite web comprising a nonwoven layer and a dense film layer.

Fibrous materials that provide useful carriers may be made of natural fibers (e.g., wood or cotton fibers), synthetic fibers (e.g., thermoplastic fibers), or a combination of natural and synthetic fibers. Exemplary materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material.

Useful carriers may have any suitable basis weight or thickness that is desired for a particular application. For a fibrous carrier, the basis weight may range, e.g., from at least about 5, 8, 10, 20, 30, or 40 grams per square meter, up to about 400, 200, or 100 grams per square meter. The carrier may be up to about 5 mm, about 2 mm, or about 1 mm in thickness and/or at least about 0.1, about 0.2, or about 0.5 mm in thickness.

In some embodiments of laminates disclosed herein, the film or film article according to the present disclosure is joined to a fibrous web carrier using surface bonding or loft-retaining bonding techniques. The term "surface-bonded" when referring to the bonding of fibrous materials means that parts of fiber surfaces of at least portions of fibers are melt-bonded to a surface of the film in such a manner as to substantially preserve the original (pre-bonded) shape of the film surface, and to substantially preserve at least some portions of the film surface in an exposed condition, in the surface-bonded area. Quantitatively, surface-bonded fibers may be distinguished from embedded fibers in that at least about 65% of the surface area of the surface-bonded fiber is visible above the film surface in the bonded portion of the fiber. Inspection from more than one angle may be necessary to visualize the entirety of the surface area of the fiber. The term "loft-retaining bond" when referring to the bonding of fibrous materials means a bonded fibrous material comprises a loft that is at least 80% of the loft exhibited by the material prior to, or in the absence of, the bonding process. The loft of a fibrous material as used herein is the ratio of the total volume occupied by the web (including fibers as well as interstitial spaces of the material that are not occupied by fibers) to the volume occupied by the material of the fibers alone. If only a portion of a fibrous web has the film surface bonded thereto, the retained loft can be easily ascertained by comparing the loft of the fibrous web in the bonded area to that of the web in an unbonded area. It may be convenient in some circumstances to compare the loft of the bonded web to that of a sample of the same web before being bonded, for example, if the entirety of fibrous web has the film surface bonded thereto. In some of these embodiments, the joining comprises impinging heated gaseous fluid (e.g., ambient air, dehumidified air, nitrogen, an inert gas, or other gas mixture) onto a first surface of the fibrous web carrier while it is moving; impinging heated fluid onto the film surface while the continuous web is moving; and contacting the first surface of the fibrous web with the film surface so that the first surface of the fibrous web is melt-bonded (e.g., surface-bonded or bonded with a loft-retaining bond) to the film surface. Impinging heated gaseous fluid onto the first surface of the fibrous web and impinging heated gaseous fluid on the film surface may be carried out sequentially or simultaneously. Further methods and apparatus for joining a continuous web to a fibrous carrier web using heated gaseous fluid may be found in U.S. Pat. Appl. Pub. Nos. 2011/0151171 (Biegler et al.) and 2011/0147475 (Biegler et al.).

In some embodiments of the laminates according to the present disclosure, the carrier is a fibrous web activated by mechanical activation. Mechanical activation processes include ring-rolling, structural elastic film processing (SELFing), which may be differential or profiled, in which not all material is strained in the direction of stretching, and other means of incrementally stretching webs as known in the art. An example of a suitable mechanical activation process is the ring-rolling process, described in U.S. Pat. No. 5,366,782 (Curro). Specifically, a ring-rolling apparatus includes opposing rolls having intermeshing teeth that incrementally stretch and thereby plastically deform the fibrous web or a portion thereof forming the outer cover, thereby rendering the outer cover stretchable in the ring-rolled regions. Activation performed in a single direction (for example the cross direction) yields an outer cover that is uniaxially stretchable. Activation performed in two directions (for example the machine and cross directions or any two other directions maintaining symmetry around the outer cover centerline) yields an outer cover that is biaxially stretchable.

In some embodiments of the laminates according to the present disclosure, where the laminate includes a film disclosed herein in any of the aforementioned embodiments and an incrementally activated fibrous web, the distance between the midpoints between two stripes separated by one strand is smaller than the pitch of the activation of the fibrous web. Activation pitch of the incrementally activated fibrous web is defined as the distance between the midpoints of two adjacent areas of higher deformation the fibrous web. Areas of higher deformation may be observed as areas of higher breakage, thinning, or higher elongation in the fibrous web. In some embodiments, areas of higher deformation may be observed as areas of a greater degree of shirring of the fibrous web. The activation pitch is typically equivalent to the pitch of the intermeshing surfaces in the apparatus used for incremental stretching. The pitch of the intermeshing surfaces is defined as the distance between two peaks of one of the intermeshing surfaces separated by one valley. The peaks can be defined as the apexes of outward pointing ridges of corrugated rolls (e.g., as described in U.S. Pat. No. 5,366,782 (Curro)) when such apparatuses are used. The peaks can also be defined as the peripheral surfaces (or center portion thereof) of discs used for incremental stretching such as those shown, for example, in U.S. Pat. No. 4,087,226 (Mercer). In other incremental stretching apparatuses, the peaks of one of the intermeshing surfaces would be readily identifiable to a person skilled in the art. In some embodiments of incrementally activated laminates according to the present disclosure, advantageously the stripes of the film in the laminate are not plastically deformed. Plastic deformation of the stripes can occur when the distance between the midpoints of two stripes separated by one strand is larger than the activation pitch since the stripes can bridge between two peaks on one of the intermeshing surfaces. The plastically deformed regions can appear non-uniform resulting in a less aesthetically pleasing laminate, or the plastic deformation can result in breakage. In contrast, in embodiments of the laminate disclosed herein in which the distance between the midpoints between two stripes separated by one strand is smaller than the pitch of the activation, the position and size of the stripes and strands allow the strands to stretch during incremental stretching of the laminate to take up the activation displacement without plastically deforming the stripes.

In some embodiments of the laminates according to the present disclosure, one or more zones of the carrier or the entire carrier may comprise one or more elastically extensible materials extending in at least one direction when a force is applied and returning to approximately their original dimension after the force is removed. In some embodiments, the extensible carrier is a nonwoven web that can be made by any of the nonwoven processes described above. The fibers for the nonwoven web may be made from elastic polymers, for example, any of those described above in connection core regions of the film disclosed herein. In some embodiments, the carrier may be extensible but inelastic. In other words, the carrier may have an elongation of at least 5, 10, 15, 20, 25, 30, 40, or 50 percent but may not recover to a large extent from the elongation (e.g., up to 40, 25, 20, 10 or 5 percent recovery). Suitable extensible carriers may include nonwovens (e.g., spunbond, spunbond meltblown spunbond, spunlace, or carded nonwovens). In some embodiments, the nonwoven may be a high elongation carded nonwoven (e.g., HEC). In some embodiments, the carrier may form pleats after it is extended. In some embodiments, the carrier is not pleated.

In some embodiments in which the laminate includes a fibrous web (e.g., a nonwoven web) that is extensible, a film or film article disclosed herein can be selected such that it has a relative low force to initially stretch the film. As described above, such a film or film article can have, for example, sheaths that are made from a softer, lower modulus material than the stripes and can have a geometry in which the thickness of the stripes is similar to the thickness of the strands (e.g., within about 20%, 10%, or 5% of the thickness of the strands). In these embodiments, the laminates may be considered not to require "activation", and the ease of initially stretching the laminate would be apparent to the user.

Laminates of an extensible fibrous web and a film or film articles according to the present disclosure can advantageously be made by bonding under pressure discontinuously at discrete bond locations. The bonding can be carried out by a patterned embossing roll in which the pattern (that is, raised area) of the embossing roll provides up to about 30%, 25%, or 20% of the surface of the embossing roll. It is possible, but not required, that the pattern may be aligned with at least some of the stripes of the film or film article. We have unexpectedly found that patterned bonding can be carried out in a nip at a temperature of up to 60° C., 55° C., 50° C., 40° C., 30° C., or even 25° C. using a pressure of at least one megapascal (MPa) (in some embodiments, 1.1, 1.2, 1.3, or 1.35 MPa). As shown in Examples 17 to 20, 22 to 25, and 27 to 30, reliable laminates with good elastic properties can be made using this method without the use of adhesives and without incremental stretching. No delamination was observed upon tensile elongation of the laminates.

In some embodiments of the laminates disclosed herein, wherein the carrier is an elastic or extensible fibrous web, a tensile elongation at maximum load of the film is up to 250 percent of the tensile elongation at maximum load of the extensible fibrous web. In embodiments in which the film undergoes plastic deformation before breaking, the tensile elongation at maximum load of the film is the elongation at the point where the film begins to undergo plastic deformation. This extension is readily recognizable as a shoulder in a stress strain curve measured as described in the Examples, below. In embodiments in which the film does not undergo plastic deformation before breaking, the tensile elongation at maximum load is the tensile elongation at break. The tensile elongation at maximum load of the fibrous web is generally the tensile elongation at break. In some embodiments, a tensile elongation at maximum load of the film is in a range from 25 percent to 250 percent, 50 percent to 225 percent, 75 percent to 200 percent, or 75 percent to 150 percent of the tensile elongation at maximum load of the extensible fibrous web. It is useful in laminates disclosed herein for the tensile elongation at maximum load of the film and the fibrous web to be comparable. In these laminates, there is not a large amount of unused elasticity in the film. For example, if an elastic film made completely of elastic polymers as described above has tensile elongation at maximum load of 800%, but an extensible fibrous web to which it is bonded only has a tensile elongation of about 200%, there is a large amount of elasticity in the film that is unused. Since more elastic polymers are typically more expensive than less elastic polymers, the unused elasticity translates to unnecessary expense. In the laminates according to the present disclosure, the alternating stripes and strands in the film allow for a lower amount of elastic polymers to be used while maintaining elongations that are comparable to extensible fibrous webs. On the other hand, the distribution of stripes and strands alternating across the film allow for more uniform extension than, for example, if only one region of elasticity was used in the film. This distribution of stripes and strands regions better utilizes the extensible potential of the extensible fibrous web. Furthermore, when the tensile elongation of the extensible fibrous web and the film are this similar, delamination of the extensible fibrous web and the film is less likely to occur than when, for example, the elastic film is much more extensible than the fibrous web. As shown in Illustrative Examples 5 to 8 below, films with elongations that are much higher than fibrous webs to which they are laminated can undergo stretch-induced delamination of the fibrous and continue to stretch after the delamination.

In some embodiments of the laminates disclosed herein, a recoverable elongation of the laminate is at least 50% of the recoverable elongation of a comparative film after elongation of 100%. The laminate may be made from an extensible fibrous web, or the laminate by be incrementally activated as described above. The recoverable elongation can be understood to be the maximum elongation that provides the film or laminate with a permanent set of up to 20%, in some embodiments, up to 15% or 10%. As used herein, recoverable elongation is determined using the test method described in the Examples, below. The comparative film is the same as the film comprising alternating first and second regions except that it is not laminated to a carrier. The comparative film may be a film that is removed from the laminate, for example, by submerging the laminate in liquid nitrogen and peeling apart the carrier and the film. Or the comparative film may be a sample made identically to the film comprising alternating first and second regions but never laminated to a carrier. In some embodiments, a recoverable elongation of the laminate is at least 75%, 80%, 85%, 90% or 95% of the recoverable elongation of a comparative film at after elongation of 100%. Again, in any of these embodiments, there is not a large amount of unused elasticity in the elastic film. Also, in embodiments in which the carrier is an extensible fibrous web, the distribution of first and second regions better utilizes the recoverable elongation of the extensible fibrous web as described above. Also, where the comparative film is a sample made identically to the film comprising alternating first and second regions but never laminated to an extensible fibrous web and subsequently incrementally stretched, when the recoverable elongation of the laminate is at least 50% (in some embodiments, 75%, 80%, 85%, 90%, or 95%) of the recoverable elongation of a comparative film after elongation of 100%, it is an indication that the incremental stretching did not plastically deform the stripes of the film.

For more information regarding laminates including films according to and/or made according to the present disclosure, see co-pending U.S. patent application Ser. No. 13/633,450 (Hanschen et al.), filed on the same day as the present application and incorporated by reference herein in its entirety.

Films and film articles described herein have a variety of uses, including wound care and other medical applications (e.g., elastic bandage-like material, surface layer for surgical drapes and gowns, and cast padding), tapes (including for medical applications), and absorbent articles (e.g., diapers and feminine hygiene products).

In absorbent articles, the film according to the present disclosure may be useful as a layer(s) within the articles and/or as part of an attachment system for the articles or elastic components. In some embodiments, the ribbon region attached to the extensible region of the film can be used to attach the film article to the absorbent article or provide a fingerlift. In some embodiments, the ribbon region can be formed with molded hooks to provide attachment to a loop. However, in some embodiments, the stripes are not formed with male fastening elements (e.g., hooks) or may not be formed with surface structure in general. Examples of disposable absorbent articles comprising films according to and/or made according to the present disclosure include disposable absorbent garments such as infant diapers or training pants, products for adult incontinence, and feminine hygiene products (e.g., sanitary napkins and panty liners). A typical disposable absorbent garment of this type is formed as a composite structure including an absorbent assembly disposed between a liquid permeable bodyside liner and a liquid impermeable outer cover. These components can be combined with films disclosed herein and other materials and features such as further elastic components or containment structures to form the absorbent article.

Figure 13:
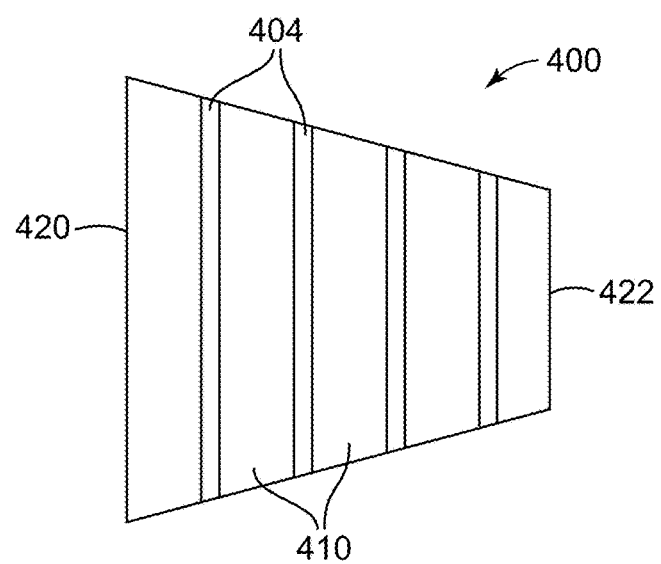
FIG. 13 is a top view of one embodiment of a film according to the present disclosure.

In some embodiments, the film according to the present disclosure may be laminated to a Fibrous (e.g., nonwoven) web. In some of these embodiments, the resulting laminate may be a fastening tab, for example, for an absorbent article. In some embodiments, the resulting laminate may be an extensible ear, for example, for an absorbent article. In some of these embodiments, the laminate may be in the shape of a trapezoid, for example, as shown in FIG. 13. While it has been observed that in a typical extensible ear shaped to have a narrower end (e.g., for a hook fastener) and a wider end (e.g., for attachment to an absorbent article), the majority of the stretch occurs at the narrow end of the ear. This can result in unused elastomeric potential, weaker tensile properties, and delamination of the fibrous web if narrow end stretches beyond the fibrous web's extension capability. In contrast, we have observed that a film having alternating stripes and strands as described herein stretches substantially evenly across the entire width of the extensible ear, even when having a trapezoid shape as in FIG. 13. In FIG. 13, film 400 includes alternating stripes 410 and strands 404. The direction of the stripes 410 and strands 404 is generally parallel to the parallel sides 420 and 422 of the trapezoid.

Some Embodiments of the Disclosure

In a first embodiment, the present disclosure provides a film comprising stripes alternating with strands comprising a core and a sheath, wherein the core is more elastic than both the sheath and the stripes.

In a second embodiment, the present disclosure provides the film of the first embodiment, wherein the sheath forms part of at least one major surface of the film.

In a third embodiment, the present disclosure provides the film of the first or second embodiment, wherein the stripes are made from a first polymeric composition that is found throughout the thickness of the stripes.

In a fourth embodiment, the present disclosure provides the film of any one of the first to third embodiments, wherein the width of the stripes is in a range from 250 micrometers to 1.5 millimeter, and wherein the width of the strands is in a range from 100 micrometers to 750 micrometers.

In a fifth embodiment, the present disclosure provides the film of any one of the first to fourth embodiments, wherein the stripes are made from a first polymeric composition, the core is made from a third polymeric composition, and the sheath is made from a second polymeric composition that is different from the first polymeric composition and the third polymeric composition.

In a sixth embodiment, the present disclosure provides the film of the fifth embodiment, wherein the second polymeric composition comprises a blend of the first polymeric composition and the third polymeric composition.

In a seventh embodiment, the present disclosure provides the film of any one of the first to sixth embodiments, wherein the film has at least 75 percent elongation in a direction transverse to the stripes and strands, and wherein the stripes make up a higher volume percentage of the film than the strands.

In an eighth embodiment, the present disclosure provides a film comprising alternating stripes and strands, wherein at least portions of the strands are more elastic than the stripes, wherein the film has an elongation of at least 75 percent, wherein the width of the strands is in a range from 100 micrometers to 750 micrometers, and wherein a portion of each strand forms part of at least one major surface of the film.

In a ninth embodiment, the present disclosure provides the film of the eighth embodiment, wherein the width of the stripes is in a range from 250 micrometers to 1.5 millimeter.

In a tenth embodiment, the present disclosure provides the film of any one of the first to ninth embodiments, wherein the film has a permanent set of up to 10 percent after stretching to 100 percent elongation at room temperature, and/or wherein the stripes make up a higher volume percentage of the film than the strands.

In an eleventh embodiment, the present disclosure provides the film of any one of the first to tenth embodiments, wherein the stripes have stretch-induced molecular orientation.

In a twelfth embodiment, the present disclosure provides the film of any one of the first to tenth embodiments, wherein the stripes have stretch-induced molecular orientation in a direction transverse to their lengths.

In a thirteenth embodiment, the present disclosure provides the film of any one of the first to tenth embodiments, wherein the stripes have stretch-induced molecular orientation and are shirred in a direction parallel to their lengths.

In a fourteenth embodiment, the present disclosure provides a film article comprising an extensible region alongside a ribbon region, wherein the extensible region comprises the film of any one of the first to thirteenth embodiments, and wherein the ribbon region comprises a film of a first polymeric composition, from which the stripes are made.

In a fifteenth embodiment, the present disclosure provides the film article of the fourteenth embodiment, wherein the ribbon region comprises stripes.

In a sixteenth embodiment, the present disclosure provides an extrusion die comprising at least a first cavity, a second cavity, a third cavity, a dispensing surface having a dispensing slot, and fluid passageways between the first, second, and third cavities and the dispensing slot, wherein the fluid passageways comprise a first fluid passageway extending from the first cavity to the dispensing slot, a third fluid passageway extending from the third cavity to the dispensing slot, at least two second fluid passageways extending from the second cavity to the dispensing slot on either side of the third fluid passageway, and wherein each of the second passageways has a dimension larger than the third passageway at the point where the third passageway enters the dispensing slot.

In a seventeenth embodiment, the present disclosure provides the extrusion die of the sixteenth embodiment, wherein the fluid passageways are provided by a plurality of sequences of shims, wherein the each sequence comprises at least one first shim that provides the first fluid passageway, at least one third shim that provides the third fluid passageway, and at least two second shims that provide the at least two second fluid passageways.

In an eighteenth embodiment, the present disclosure provides the extrusion die of the seventeenth embodiment, wherein each sequence of shims further comprises at least two spacer shims, each spacer shim being between the at least one third shim and one of the at least two second shims, wherein the spacer shim has a dispensing opening but lacks a passageway between the dispensing opening and any of the first, second, or third cavities.

In a nineteenth embodiment, the present disclosure provides the extrusion die of the seventeenth or eighteenth embodiment, further comprising a fourth fluid passageway extending from the first cavity to the dispensing slot.

In a twentieth embodiment, the present disclosure provides the extrusion die of the nineteenth embodiment, wherein the fourth fluid passageway is provided by a plurality of shims.

In a twenty-first embodiment, the present disclosure provides the extrusion die of the twentieth embodiment, wherein the plurality of shims comprises a plurality of a second sequence of shims.

In a twenty-second embodiment, the present disclosure provides the extrusion die of the twenty-first embodiment, wherein the second sequence of shims includes a spacer shim with a dispensing opening but with no passageway between the dispensing opening and the first cavity.

In a twenty-third embodiment, the present disclosure provides a method of making a film, the method comprising:
providing the extrusion die of any one of the sixteenth to twenty-second embodiments;
extruding polymeric compositions from the first, second, and third cavities so as to form the film comprising stripes alternating with strands comprising a core and a sheath.

In a twenty-fourth embodiment, the present disclosure provides the method of the twenty-third embodiment, wherein the core is more elastic than both the stripes and the sheath.

In a twenty-fifth embodiment, the present disclosure provide the method of the twenty-third or twenty-fourth embodiment, wherein the sheath forms part of at least one major surface of the film. The film may be, for example, the film of any one of the first to seventh embodiments.

In a twenty-sixth embodiment, the present disclosure provide the method of any one of the twenty-third to twenty-fifth embodiments, further comprising stretching the film to provide stretch-induced molecular orientation in the stripes.

In a twenty-seventh embodiment, the present disclosure provide the method of any one of the twenty-third to twenty-fifth embodiments, further comprising stretching the film in the cross-machine direction to provide stretch-induced molecular orientation in the stripes.

In a twenty-eighth embodiment, the present disclosure provide the method of any one of the twenty-third to twenty-fifth embodiments, further comprising stretching the film in the machine direction to plastically deform the stripes and allowing the stretched film to relax to provide a textured film article.

In a twenty-ninth embodiment, the present disclosure provides a method of making a film, the method comprising:
providing the extrusion die of any one of the nineteenth to twenty-second embodiments, wherein the fourth fluid passageway is provided by a shim in a second sequence of shims, and wherein the second sequence of shims further includes a spacer shim with a dispensing opening but with no passageway between the dispensing opening and the first cavity; and
extruding polymeric compositions from the first, second, and third cavities so as to form the film comprising an extensible region alongside a ribbon region, wherein the extensible region comprises stripes alternating with strands each comprising a core and a sheath, and wherein the ribbon region comprises a film of a first polymeric composition, from which the stripes are made, extruded through a plurality of the second sequence of shims. The film may be, for example, the film article of the fourteenth or fifteenth embodiment as dependent on any one of the first to sixth embodiments.

In a thirtieth embodiment, the present disclosure provides the method of the twenty-ninth embodiment, wherein the core is more elastic than both the stripes and the sheath.

In a thirty-first embodiment, the present disclosure provides the method of the twenty-ninth or thirtieth embodiment, wherein the sheath forms part of at least one major surface of the film.

In a thirty-second embodiment, the present disclosure provides the method of any one of the twenty-ninth to thirty-first embodiments, wherein the plurality of fourth fluid passageways comprises a plurality of a second sequence of shims, wherein the second sequence includes at least one fourth shim that provides a fourth fluid passageway between the first cavity and the dispensing slot and at least one spacer shim with a dispensing opening but with no passageway between the dispensing opening and the first cavity.

In a thirty-third embodiment, the present disclosure provides a method of controlling the caliper in an extruded film, the method comprising:
providing an extrusion die comprising a plurality of shims positioned adjacent to one another, the shims together defining at least a first cavity and a die slot with a distal opening, wherein each of the plurality of shims defines a portion of the distal opening, wherein the plurality of shims includes first shims providing a passageway between the first cavity and the die slot with their distal openings together providing a dispensing opening in the die slot, and wherein the plurality of shims further includes spacer shims having a dispensing orifice but lacking a passageway between the dispensing orifice and the first cavity; and
extruding a polymeric composition from the first cavity to provide the extruded film; wherein the caliper of the extruded film is controlled by adjusting the width of the dispensing opening between the spacer shims.

In a thirty-fourth embodiment, the present disclosure provides a laminate comprising the film of any one of the first to tenth embodiments joined to a fibrous carrier.

In a thirty-fifth embodiment, the present disclosure provides the laminate of the thirty-fourth embodiment, wherein the fibrous carrier is an incrementally activated fibrous web having an activation pitch, wherein a distance between midpoints of two stripes separated by one strand is smaller than the activation pitch, and wherein the stripes are not plastically deformed.

In a thirty-sixth embodiment, the present disclosure provides the laminate of the thirty-fourth or thirty-fifth embodiment, wherein the recoverable stretch of the laminate is at least fifty percent of the recoverable stretch of the film.

In a thirty-seventh embodiment, the present disclosure provides the laminate of any one of the thirty-fourth to thirty-sixth embodiments, wherein the fibrous carrier is a nonwoven.

In a thirty-eighth embodiment, the present disclosure provides the laminate of the thirty-fourth embodiment, wherein the fibrous carrier is extensible with a tensile elongation at maximum load of at least 50 percent.

In a thirty-ninth embodiment, the present disclosure provides the laminate of the thirty-fourth embodiment, wherein the fibrous carrier is extensible, and wherein a tensile elongation at maximum load of the film is up to 250 percent of the tensile elongation at maximum load of the extensible fibrous web.

In a fortieth embodiment, the present disclosure provides the laminate of the thirty-eighth or thirty-ninth embodiment, wherein the thickness of the stripes is within about 20% of the thickness of the strands.

In a forty-first embodiment, the present disclosure provides a laminate of any one of the thirty-eighth to fortieth embodiments, wherein the film is discontinuously bonded to the fibrous carrier, and wherein the fibrous carrier is bonded to the film predominantly at one of the stripes or the strands.

In a forty-second embodiment, the present disclosure provides an absorbent article comprising the film or film article of any of the first to fifteenth embodiments or a laminate of any of the thirty-fourth to forty-first embodiments. In order that this disclosure can be more fully understood, the following examples are set forth. It should be understood that these examples are for illustrative purposes only, and are not to be construed as limiting this disclosure in any manner. All parts and percentages are by weight unless otherwise indicated.

EXAMPLES

Cross machine direction tensile (tensile elongation to break) and cross machine direction 2-cycle hysteresis (to 100% elongation) were done for all the samples on an "INSTRON" tensile tester (obtained from Instron Corporation, Norwood, Mass.) using a minimum of 3 replicates. The "INSTRON" tensile tester was one of models "1122", "5500R", "5564HS", or "3345" universal constant rate of extension tensile testing tester with strip chart recorder or computer and "BLUEHILL" material testing software obtained from Instron Corporation. The instrument was calibrated to an accuracy of one percent of the full scale and the scale range used for the test was within 20-90 percent of full range.

The samples for evaluation were all 1 inch (2.54 cm) wide and 50 mm gauge length (GL). A crosshead speed of 20 inches (50.8 cm) per minute was used. Evaluations were carried out at 72° F. (22° C.) plus or minus 4° F. (2.2° C.) and 50% relative humidity plus or minus 5% relative humidity. For Examples 13 to 17 and Illustrative Examples 1 to 4 a gauge length of 45 mm was used. During the two-cycle hysteresis measurement, there was a one-second hold before the first load to 100%, a one-second hold before the first unload to 0%, a one-second hold before the second load to 100%, and a one-second hold before the second unload to 0%.

Permanent set was determined from the two-cycle hysteresis, where the return speed was also 20 inches (50.8 cm) per minute. Permanent set was calculated from the elongation (%) (i.e., tensile strain) at 0.1 N after the second unload minus the elongation (%) (i.e., tensile strain) at 0.1 N at the first load.

Example 1

A co-extrusion die with three cavities, as generally depicted in FIG. 10, and assembled with a shim repeating pattern as generally illustrated in FIGS. 6 to 8, was prepared. The orifice height of the dispensing slot was 0.030 inch (0.762 mm). The extrusion die was comprised of three zones to create a first zone of a polymer ribbon region, a second zone to provide an extensible region having alternating stripes and core/sheath strands in a film, and then a third zone of a polymer ribbon region. The first and third zones were created with a repeat sequence of 6 shims to create a zone width of about 45 mm with the number of repeats necessary to give 45 mm. Four identical shims 4540, with connection to the first cavity 4562b, depicted in FIG. 2, followed by two spacer shims 4740, depicted in FIG. 4 were thus stacked together in a repeating sequence to create zone 1 and zone 3. The thickness of the shims in the repeat sequence was 0.04 inch (0.102 mm) for shims 4540 and 0.02 inch (0.051 mm) for shims 4740. To create zone 2, one spacer shim 4740, depicted in FIG. 4, followed by one shim 4640 with connection to a second cavity 4562a, depicted in FIG. 3, followed by one spacer shim 4740, followed by 2 identical shims 4840 with connection to the third cavity 4562c, depicted in FIG. 5, followed by one spacer shim 4740, followed by one shim 4640 with connection to the second cavity 4562a, followed by one spacer shim 4740, followed by four identical shims 4540 with connection to the first cavity 4562b, were stacked together in a repeating sequence. The thickness of the shims in the repeat sequence was 0.04 inch (0.102 mm) for shims 4540 and 4840 and 0.02 inch (0.051 mm) for shims 4640 and 4740. The dispensing opening of shim 4840 had a height at constriction 4896 of 0.012 inch (0.30 mm). The extrusion orifices of the shims were aligned in a collinear arrangement as shown in FIG. 10. The total width of the shim setup was 160 mm. The shim assembly was aligned using the alignment key on a vibrating table and compressed between two end blocks with four ½ inch (12.7 mm) bolts.

The inlet fittings on the two end blocks were each connected to conventional single-screw extruders. A chill roll was positioned adjacent to the distal opening of the co-extrusion die to receive the extruded material. The extruder feeding the first cavity was loaded with a mixture of approximately 50% by weight polypropylene resin having a melt flow index of 3 (obtained under the trade designation "3376" from Total Petrochemicals, Houston, Tex., but no longer available) and approximately 50% by weight polypropylene resin having a melt flow index of 12 (obtained under the trade designation "EXXONMOBIL PP1024E4" from ExxonMobil, Irving, Tex.), and less than 2% white concentrate in polypropylene.

The extruder feeding the third cavity was loaded with styrene isoprene styrene block copolymer pellets (obtained under the trade designation "KRATON D1114 P" polymer from Kraton Polymers, Houston, Tex.).

The extruder feeding the second cavity was loaded with a mixture of approximately 50% by weight styrene isoprene styrene block copolymer pellets (obtained under the trade designation "KRATON D1114 P" polymer) and approximately 50% by weight polypropylene resin (obtained under the trade designation "1024" from Exxon Mobil) and less than 2% by weight blue concentrate in polypropylene.

The flow rate of first polymer was 2.77 kg/hr. The flow rate of second polymer was 0.09 kg/hr. The flow rate of the third polymer was 0.95 kg/hr. The extrusion temperature was 210° C. The quench roll temperature was 10° C. The quench takeaway speed was 10.7 m/minute. The basis weight of film was 48.8 grams per square meter.

Using an optical microscope, the following average film dimensions were measured:
 width of stripes=415 micrometers
 thickness of stripes=71 micrometers
 width of strands=367 micrometers
 thickness of strands=68 micrometers
 thickness of sheath=2.7 micrometers Elongation to break was measured using the test method described above using three replicates, and the average was 525%. Permanent set was measured using the test method described above using three replicates, and the average was 7.8%. Load 1 at 50% elongation=1.81 N, Load 2 at 50% elongation=1.33 N, Unload 2 at 50% elongation=1.11 N.

Example 2

Example 2 was carried out using the method of Example 1, with the following modifications. Zones 1 and 3 were modified so that the repeating sequence was three identical shims 4540 followed by two spacer shims 4740. The extruder feeding the first cavity was loaded with a mixture of with a mixture of approximately 50% by weight polypropylene resin (obtained under the trade designation "EXXONMOBIL PP 3155" from ExxonMobil) and approximately 50% by weight polypropylene resin (obtained under the trade designation "EXXONMOBIL PP1024E4" from ExxonMobil), and less than 2% white concentrate in polypropylene. The extruder feeding the third cavity was loaded with a mixture of approximately 90% by weight styrene isoprene styrene block copolymer pellets (obtained under the trade designation "KRATON D1114 P" polymer from Kraton Polymers) and approximately 10% polystyrene (obtained from Total Petrochemicals under trade designation "TOTAL PSC 529" polystyrene). The extruder feeding the second cavity was loaded with a mixture of approximately 50% by weight styrene isoprene styrene block copolymer pellets (obtained under the trade designation "KRATON D1114 P" polymer) and approximately 50% by weight polypropylene resin (obtained under the trade designation "EXXONMOBIL PP 3155" from Exxon Mobil) and less than 2% by weight blue concentrate in polypropylene.

The flow rate of first polymer was 2.72 kg/hr. The flow rate of second polymer was 0.32 kg/hr. The flow rate of the third polymer was 0.82 kg/hr. The quench takeaway speed was 9.1 m/minute. The basis weight of film was 77 gsm.

Using an optical microscope, the strands were observed to be nearly spherical. The following film dimensions were measured:

width of stripes=548 micrometers
thickness of stripes=52 micrometers
width (diameter) of strands=152 micrometers
thickness of sheath=13 micrometers Elongation to break was measured using the test method described above using five replicates, and the average was 135%. Permanent set was measured using the test method described above using five replicates, and the average was 11.5%. Load 1 at 50% elongation=11.5 N, Load 2 at 50% elongation=4.60 N, Unload 2 at 50% elongation=3.05 N.

Example 3

Example 3 was carried out using the method of Example 1, with the following modifications. A transition zone that consisted of one spacer shim 4740 was added between Zone 2 and Zone 1 and between Zone 2 and Zone 3. The extruder feeding the second cavity was loaded with a mixture of approximately 50% by weight polypropylene resin (obtained under the trade designation "3376" from Total Petrochemicals) and approximately 50% by weight polypropylene resin (obtained under the trade designation "EXXONMOBIL PP1024E4" from ExxonMobil), and less than 2% white concentrate in polypropylene, which was the same as the mixture feeding the first cavity. The extruder feeding the third cavity was loaded with the same polymeric composition described in Example 1. The basis weight of film was 43 gsm.

Using an optical microscope, the following film dimensions were measured:

width of stripes=475 micrometers (average of two measurements)
thickness of stripes=91 micrometers (average of two measurements)
width of strands=403 micrometers (average of four measurements)
thickness of strands=83 micrometers (average of two measurements)
thickness of sheath=11.1 micrometers (average of three measurements)

Elongation to break was measured using the test method described above using three replicates, and the average was 488%. Permanent set was measured using the test method described above using three replicates, and the average was 7.2%. Load 1 at 50% elongation=2.17 N, Load 2 at 50% elongation=1.27 N, Unload 2 at 50% elongation=1.01 N.

Example 4

Example 4 was carried out as described in Example 1 with the following modifications. The extruder feeding the first cavity was loaded with polypropylene resin (obtained under the trade designation "EXXONMOBIL PP1024E4" from ExxonMobil) and less than 2% white concentrate in polypropylene. The extruder feeding the third cavity was loaded with the same polymeric composition described in Example 1. The extruder feeding the second cavity was loaded with a mixture of approximately 50% by weight styrene isoprene styrene block copolymer pellets (obtained under the trade designation "KRATON D1114 P" polymer) and approximately 50% by weight polypropylene resin (obtained under the trade designation "EXXONMOBIL PP 3155" from Exxon Mobil) and less than 2% by weight white concentrate in polypropylene. The flow rate of first polymer was 2.77 kg/hr. The flow rate of second polymer was 0.18 kg/hr, and the flow rate of the third polymer was 0.91 kg/hr. The basis weight of film was 42 gsm.

Using an optical microscope, the following film dimensions were measured:

width of stripes=627 micrometers
width of strands=237 micrometers
thickness of sheath=7 micrometers The film was stretched 500% in the CD in an "INSTRON" tensile tester at 50.8 cm per minute such that the stripes had undergone permanent deformation.

Elongation to break was measured using the test method described above using three replicates, and the average was 104%. Permanent set was measured using the test method described above using three replicates, and the average was 18.0%. Load 1 at 50% elongation=3.73 N, Load 2 at 50% elongation=2.34 N, Unload 2 at 50% elongation=1.61 N; break at 104% elongation 27.8 N.

Example 5

Example 5 was carried out as described in Example 1 except the extruder feeding the first cavity was loaded with polypropylene resin (obtained under the trade designation "EXXONMOBIL PP1024E4" from ExxonMobil) and less than 5% white concentrate in polypropylene. The extruder feeding the second cavity was loaded with a mixture of approximately 50% by weight styrene isoprene styrene block copolymer pellets (obtained under the trade designation "KRATON D1114 P" polymer) and approximately 50% by weight polypropylene resin (obtained under the trade designation "EXXONMOBIL PP 3155" from Exxon Mobil) and less than 5% by weight white concentrate in polypropylene. The extruder feeding the third cavity was loaded with the same polymeric composition described in Example 1. The basis weight of the film was approximately 47 gsm.

| | |
|---|---|
| Flow rate of first polymer | 2.77 kg/hr. |
| Flow rate of second polymer | 0.18 kg/hr. |
| Flow rate of the third polymer | 0.91 kg/hr. |

The film was stretched 500% in the MD in an "INSTRON" tensile tester at 50.8 cm per minute such that the stripes had undergone permanent deformation.

A digital optical image at 30× of the resulting film is shown in FIG. 11.

Example 6

Example 6 was carried out as described in Example 1 with the following modifications. The die did not include zones 212, 216, 218, or 214 as shown in FIG. 7. The orifice was created with a repeat sequence of 18 shims. One spacer shim 4740, depicted in FIG. 4, followed by one shim 4640 with connection to a second cavity 4562a, depicted in FIG. 3, followed by one spacer shim 4740, followed by 2 identical shims 4840 with connection to the third cavity 4562c, depicted in FIG. 5, followed by one spacer shim 4740, followed by one shim 4640 with connection to the second cavity 4562a, followed by one spacer shim 4740, followed by ten identical shims 4540 with connection to the first cavity 4562b, depicted in FIG. 2, were stacked together in a repeating sequence of 95 repeats. The thickness of the shims in the repeat sequence was 0.004 inch (0.102 mm) for shims 4540 and 4840 and 0.002 inch (0.051 mm) for shims 4640 and 4740. The total width of the shim setup was 145 mm. The extruder feeding the first cavity was loaded with a mixture of 25% propylene resin "EXXONMOBIL PP1024E4" from ExxonMobil and 75% polypropylene resin "3376" from Total Petrochemicals with less than 5% white concentrate in polypropylene. The extruder feeding the third cavity was loaded with the same polymeric composition described in Example 1. The extruder feeding the second cavity was loaded with polypropylene resin "EXXONMOBIL PP1024E4" obtained from Exxon Mobil and less than 5% by weight white concentrate in polypropylene. The flow rate of first polymer was 0.27 kg/hr. The flow rate of second polymer was 20.5 kg/hr, and the flow rate of the third polymer was 6.71 kg/hr. At 10 lbs/inch/hour (10.7 kg/cm/hour) a 12 micrometer thick film was made at 300 feet per minute (91 meters per minute). No draw resonance was observed. The basis weight of the film was 41.7 gsm.

Using an optical microscope, the following film dimensions were measured:
width of stripes=1001 micrometers
width of strands=411 micrometers
thickness of sheath=2.07 micrometers

Example 7

Example 7 was made according to the method of Example 6 with the modification the film was made at 400 feet per minute (122 meters per minute), and the extruders feeding both the first and second cavities extruded a mixture of 75% propylene resin "EXXONMOBIL PP1024E4" from Exxon-Mobil and 25% polypropylene resin "3376" from Total Petrochemicals with less than 5% white concentrate in polypropylene. No draw resonance was observed. The basis weight of the film was 25.0 gsm.

Using an optical microscope, the following film dimensions were measured:
width of stripes=1697 micrometers
width of strands=393 micrometers
thickness of sheath=3.14 micrometers

Prophetic Examples 8 to 11 (P.E. 8-11)

The following resins and process conditions can be used to make films according to the present disclosure using any of the methods described above form Examples 1 to 7. For each of the Prophetic Examples 8 to 11, the $2^{nd}$ Polymer Composition can be a 50/50 blend of the $1^{st}$ Polymeric Composition and the $3^{rd}$ Polymeric Composition.

| Example | $1^{st}$ Polymer Composition | $3^{rd}$ Polymer Composition |
|---|---|---|
| P.E. 8 | poly(ethylene terephthalate) | "DUPONT HYTREL" polyester, available from E. I. DuPont de Nemours and Co. |
| P.E. 9 | polycarbonate | "KURARAY LA4285" acrylic elastomer, available from Kuraray Co., Ltd., Tokyo, Japan |
| P.E. 10 | "IROGRAN A60 E 4902" polyurethane, available from Huntsman Corporation, Salt Lake City, Utah | "IROGRAN PS440" polyurethane, available from Huntsman Corp. |
| P.E. 11 | "EXXONMOBIL PP1024E4" polypropylene | "VISTAMAXX 6202" propylene elastomer, from ExxonMobil |

Example 12

Example 12 was made according to the method of Example 6 with the following modifications. The extruders feeding the first and second cavities were loaded with a mixture of 25% by weight polypropylene pellets (obtained under the trade designation "EXXONMOBIL PP1024E4" from ExxonMobil) and 75% by weight polypropylene pellets (obtained, but no longer available, under the trade designation "3376" from Total Petrochemicals and having a melt flow index of 3), and with 5% of a white color concentrate in 50% polypropylene. The extruder feeding the third cavity was loaded with styrene isoprene styrene block copolymer pellets (obtained under the trade designation "KRATON D1114 P" polymer from Kraton Polymers). Other process conditions are as follows. The flow rate of first polymer was 4.1 kg/hr. The flow rate of second polymer was 0.4 kg/hr. The flow rate of the third polymer was 1.3 kg/hr. The extrusion temperature was 227° C. The quench roll temperature was 16° C. The quench takeaway speed was 17 m/minute. The basis weight of film was 42 grams per square meter.

Using an optical microscope, the following film dimensions were measured:
width of stripes (including first polymer)=1.3 millimeters
width of second regions (including core/sheath strands)= 463 micrometers Elongation to break of the film was measured using the test method described above using three replicates, and the average was 251%. Permanent set of the film was measured using the test method described above using three replicates, and the average was 6.7%. Load 1 at 50% elongation=2.6 N, Load 2 at 50% elongation=1.0 N.

Example 13

The film of Example 12 was converted to 55 mm in width. The film was adhesively laminated between two 22 gsm hydrophobic nonwovens measuring 90 mm in width obtained from Fitesa, Simpsonville, S.C., having item number "C1223" and style number "570D". The film was positioned between two nonwoven layers, equidistant from the edges. A hot melt adhesive obtained from H. B. Fuller, St. Paul, Minn., under the trade designation "HL-2900" was used to bond the layers together. Spray heads available from ITW, Glenview, Ill., (part 105224F—13 orifices per inch) were used to apply the adhesive at 311° F. (155° C.). The spray was delivered in an all over pattern coating. The lamination of the three layers occurred in two passes. Bonding the film to the first nonwoven required two 1-inch (2.54-cm) and one 0.5-inch (1.27-cm) spray heads. During the second pass, the 0.5-inch (1.27-cm) spray head was replaced with a 1-inch (2.54-cm) spray head for a total of three 1-inch (2.54-cm) spray heads. The air pressure of the spray heads was 30 psi ($2.1 \times 10^5$ Pa). The sample was processed at 10 feet per minute while using a Nordson Microset Multi Scan Series 3500 pump, obtained from Nordson, Westlake, Ohio. The pump's flow rate was at 40% capacity. This amounted to approximately 50 grams per square meter of adhesive on the laminate (25 gsm per side). The nonwovens were lightly pressed.

The laminate was incrementally stretched across the entire width in the cross-direction at Biax-Fiberfilm Corporation, Greenville, Wis. The stretching apparatus was one meter wide and contained discs that had a thickness of 0.03 inch (0.76 mm) and a diameter of 10.0 inches (25.4 cm). The pitch of the discs was 0.130 inch (3.3 mm). The material was processes at 30 feet per minute with a depth of engagement of 0.115 inch (0.292 mm).

Elongation to break of the laminate was measured using the test method described above using three replicates. The average was 207%. Permanent set of the laminate was measured using the test method described above using three replicates, and the average was 14%. Load 1 at 50% elongation=3.2 N, Load 2 at 50% elongation=1.2 N.

Example 14

Example 14 was made using the method of Example 1, with the following modifications. Zones 1 and 3 were modified so that the repeating sequence was five identical shims 4540 followed by two spacer shims 4740. The extruder feeding the first cavity was loaded with a mixture of 50% by weight polypropylene pellets (obtained under the trade designation "3376" from Total Petrochemicals) and 50% by weight polypropylene pellets (obtained under the trade designation "EXXONMOBIL PP1024E4" from ExxonMobil) and with less than 2% of a white color concentrate in 50% polypropylene. The extruder feeding the second cavity was loaded with the same mixture of as that feeding the first cavity except using less than 2% of a blue color concentrate in 50% polypropylene. The extruder feeding the third cavity was loaded with the same polymeric composition described in Example 1. The flow rate of first polymer was 2.9 kg/hr. The flow rate of second polymer was 0.16 kg/hr. The flow rate of the third polymer was 1.0 kg/hr. The basis weight of film was 38 grams per square meter.

Using an optical microscope, the following film dimensions were measured:
 width of stripes (including first polymer)=566 micrometers
 width of second regions (including core/sheath strands) =302 micrometers Elongation to break of the film was measured using the test method described above using three replicates, and the average was 457%. Permanent set of the film was measured using the test method described above using three replicates, and the average was 8.94%. Load 1 at 50% elongation=2.6 N, Load 2 at 50% elongation=1.3 N.

The lamination and incremental stretching methods of Example 13 were then carried out. Elongation to break of the laminate was measured using the test method described above using three replicates, and the average was 299%. Permanent set of the laminate was measured using the test method described above using three replicates, and the average was 17.2%. Load 1 at 50% elongation=4.4 N, Load 2 at 50% elongation=1.6 N.

Example 15

The film prepared in Example 14 was adhesively laminated to two 22 gsm hydrophobic nonwovens measuring 90 mm in width obtained from Sandler AG, Schwartzenbach/Saale Germany, under the trade designation "SAWABOND 4159" using the lamination procedure described in Example 13. The laminate was then incrementally stretched using the procedure described in Example 13 to provide the laminate of Example 15. Elongation to break of the laminate was measured using the test method described above using three replicates, and the average was 321%. Permanent set of the laminate was measured using the test method described above using three replicates, and the average was 15.1%. Load 1 at 50% elongation=3.7 N, Load 2 at 50% elongation=1.5 N.

Example 16

The film made in Example 14 was adhesively laminated to two 25 gsm spunlace nonwovens measuring 90 mm in width obtained from Sandler AG, under the trade designation "SAWATEX 22628" using the lamination procedure described in Example 13. The laminate was then incrementally stretched using the procedure described in Example 13 to provide the laminate of Example 16. Elongation to break of the laminate was measured using the test method described above using three replicates, and the average was 243%. Permanent set of the laminate was measured using the test method described above using three replicates, and the average was 17.2%. Load 1 at 50% elongation=3.2 N, Load 2 at 50% elongation=1.5 N.

Illustrative Example 1

The laminate of Illustrative Example 1 was prepared according to the method of Examples 12 and 13 with the following modifications. In the repeat sequence of shims for the co-extrusion die, the ten identical shims 4540 with connection to the first cavity 4562*b*, depicted in FIG. 2 was replaced with forty shims 4540 with connection to the first cavity 4562*b* interrupted by a spacer shim 4740, depicted in FIG. 4, after every ten shims. The total width of shims used to create the first region was 166 mils (4.15 mm). The flow rate of first polymer was 3.1 kg/hr. The flow rate of second polymer was 0.2 kg/hr. The flow rate of the third polymer was 0.8 kg/hr. The extrusion temperature and quench roll temperature were the same as in Example 12. The quench takeaway speed was 15 m/minute. The basis weight of film was 40 grams per square meter.

Elongation to break of the film was measured using the test method described above using three replicates, and the average was 79.2%. Since the elongation to break was less than 100%, the permanent set was not measured according to the test method above.

Using an optical microscope, the following film dimensions were measured:
width of stripes (including first polymer)=4.45 mm
width of second regions (including core/sheath strands) =355 micrometers The lamination and incremental stretching methods of Example 13 were then carried out to provide Illustrative Example 1. Elongation to break of the laminate was measured using the test method described above using three replicates, and the average was 71.6%. Since the elongation to break was less than 100%, the permanent set was not measured according to the test method above. Load 1 at 50% elongation=5.0 N.

Illustrative Example 2

Illustrative Example 2 was made according to the method of Illustrative Example 1 except the flow rate of the third polymer was 0.4 kg/hr.

Elongation to break of the film was measured using the test method described above using three replicates, and the average was 24.1%. Since the elongation to break was less than 100%, the permanent set was not measured according to the test method above.

Using an optical microscope, the following film dimensions were measured:
width of stripes (including first polymer)=4.65 mm
width of second regions (including core/sheath strands) =187 micrometers Elongation to break of the laminate was measured using the test method described above using three replicates, and the average was 150.5%. In this sample, the nonwoven continued to stretch even after partially breaking. Permanent set of the laminate was measured using the test method described above using three replicates. One sample broke, and the average of the other two samples was 71.4%. Load 1 at 50% elongation=2.4 N, Load 2 at 50% elongation=0.7 N. Plastic deformation was visible in a photomicrograph of Illustrative Example 2.

Illustrative Example 3

The laminate of Illustrative Example 3 was prepared according to the method of Example 12 with the following modifications. In the repeat sequence of shims for the co-extrusion die, the ten identical shims 4540 with connection to the first cavity 4562b, depicted in FIG. 2, were replaced with forty shims 4540 with connection to the first cavity 4562b interrupted by a spacer shim 4740, depicted in FIG. 4, after every ten shims. The total width of shims used to create the first region was 166 mils (4.15 mm). Also, the two identical shims 4840 with connection to the third cavity 4562c, depicted in FIG. 5, were replaced with eight shims 4840 with connection to the third cavity 4562c interrupted by a spacer shim 4740, depicted in FIG. 4, after every two shims. The total width of shims used to create the core region from the third cavity was 38 mils (0.95 mm). The extruders feeding the first and second cavities were loaded with polypropylene pellets (obtained under the trade designation "EXXONMOBIL PP1024E4" from ExxonMobil) with 5% of a white color concentrate in 50% polypropylene. The extruder feeding the third cavity was loaded with the same polymeric composition described in Example 1.

The flow rate of first polymer was 4.5 kg/hr. The flow rate of second polymer was 0.2 kg/hr. The flow rate of the third polymer was 1.4 kg/hr. The extrusion temperature was 218° C. The quench roll temperature was 16° C. The quench takeaway speed was 15 m/minute. The basis weight of film was 43 grams per square meter.

Elongation to break of the film was measured using the test method described above using three replicates, and the average was 103%. Permanent set of the laminate was measured using the test method described above using three replicates. One sample broke, and the average of the other two samples was 11.4%. Load 1 at 50% elongation=7.4 N, Load 2 at 50% elongation for the two samples that did not break=2.9 N.

Using an optical microscope, the following film dimensions were measured:
width of stripes (including first polymer)=4.89 millimeters
width of second regions (including core/sheath strands) =544 micrometers The lamination and incremental stretching methods of Example 13 were then carried out to provide Illustrative Example 3.

Elongation to break of the laminate was measured using the test method described above using three replicates, and the average was 110%. Permanent set of the laminate was measured using the test method described above using three replicates. One sample broke, and the average of the other two samples was 28%. Load 1 at 50% elongation=6.6 N, Load 2 at 50% elongation for the two samples that did not break=2.4 N.

Illustrative Example 4

Illustrative Example 4 was made according to the method of Illustrative Example 3 except the flow rate of the first polymer was 4.1 kg/hr.

Elongation to break of the film was measured using the test method described above using three replicates, and the average was 137%. Permanent set of the film was measured using the test method described above using three replicates. One sample broke, and the average of the other two samples was 5.1%. Load 1 at 50% elongation=4.6 N, Load 2 at 50% elongation for the two samples that did not break=2.9 N.

Using an optical microscope, the following film dimensions were measured:
width of stripes (including first polymer)=4.64 mm
of second regions (including core/sheath strands)=549 micrometers Elongation to break of the laminate was measured using the test method described above using three replicates, and the average was 153%. Permanent set of the laminate was measured using the test method described above using three replicates. One sample broke, and the average of the other two samples was 26%. Load 1 at 50% elongation=5.1 N, Load 2 at 50% elongation=2.4 N.

Example 17

A sample of the film from Example 3 was sandwiched between two layers of 25 gsm spunlace nonwoven obtained from Sandler AG under the trade designation "SAWATEX 22628". The resulting sandwich was nipped at 200 psi ($1.4 \times 10^6$ Pa) between a smooth steel roll and a patterned roll with raised bonding sites making up 14% to 17% of its surface area. Both rolls were at 75° F. (24° C.).

The spunlace nonwoven "SAWATEX 22628" was evaluated for tensile elongation using the test method described above. The average maximum load and the tensile elongation at maximum load for an average of five samples were 5.9 N and 314%, respectively.

Elongation to break of the laminate was measured using the test method described above using three replicates, and the average was 157%. The average elongation at maximum load was 151%, and the maximum load was 5.9 N. Permanent set of the laminate was measured using the test method described above using three replicates. The average of three samples was 14.3%. Load 1 at 100% elongation=5.0 N, Load 2 at 100% elongation=4.3 N.

Examples 18 to 20

Examples 18 to 20 were prepared according to the method of Example 17 with the following modifications. For Example 18, both the smooth roll and the patterned roll were heated at 125° F. (52° C.). For Example 19, 22 gsm hydrophobic carded nonwoven obtained from Fitesa with item number "C1223" and style "570D" was used instead of the spunlace nonwoven "SAWATEX 22628". The carded nonwoven item "C1223", style "570D" from Fitesa was evaluated for tensile elongation using the test method described above. The average maximum load and the tensile elongation at maximum load for an average of five samples were 1.3 N and 199%, respectively. For Example 20, both the smooth roll and the patterned roll were heated at 125° F. (52° C.), and 22 gsm hydrophobic nonwoven obtained from Fitesa with item number "C1223" and style "570D" was used instead of the spunlace nonwoven "SAWATEX 22628". The elongation to break, elongation at maximum load, maximum load, permanent set, load 1 at 100% elongation and load 2 at 100% elongation for the laminates of Examples 6 to 8 are shown in Table 1, below.

TABLE 1

| Example | Elongation to Break (%) | Elongation at Max load (%) | Max load (N) | Permanent set (%) | Load 1 at 100% (N) | Load 2 at 100% (N) |
|---|---|---|---|---|---|---|
| 18 | 229 | 229 | 9.56 | 13.1 | 5.65 | 4.85 |
| 19 | 197 | 99 | 3.42 | 12.9 | 3.24 | 2.98 |
| 20 | 103 | 100 | 3.69 | 9.7 | 4.77 | 4.34 |

Example 21

Film Example 21 was made using the method of Example 12, with the following modifications. In the repeat sequence of shims for the co-extrusion die, the ten identical shims 4540 with connection to the first cavity 4562b, depicted in FIG. 2, was replaced with four shims 4540 with connection to the first cavity 4562b. The total width of the shim set-up was 9 inches (230 mm). The extruder feeding the first cavity was loaded with polypropylene pellets (obtained under the trade designation "EXXONMOBIL PP1024E4" from ExxonMobil) and with less than 3% of a white color concentrate in 50% polypropylene. The extruder feeding the second cavity was loaded with a mixture of 60% polypropylene "EXXONMOBIL PP1024E4" obtained from ExxonMobil and 40% of an elastomeric resin obtained from Kraton Polymers under the trade designation "KRATON MD6843", with less than 3% of a white color concentrate in 50% polypropylene. The extruder feeding the third cavity was loaded with a mixture of 69% an elastomeric resin obtained under the trade designation "KRATON MD6843", obtained from Kraton Polymers, and 31% of a tackifying resin obtained from ExxonMobil under the trade designation "ESCOREZ 1310LC". The flow rate of first polymer was 10 pounds/hour (4.5 kg/hr). The flow rate of second polymer was 1.1 pounds/hour (0.5 kg/hour). The flow rate of the third polymer was 5.9 pounds/hour (2.7 kg/hour). The quench roll temperature was 15.5° C. The quench takeaway speed was 21 m/minute. The basis weight of film was 29.5 grams per square meter.

Using an optical microscope, the following film dimensions were measured:
 width of stripes=556 micrometers
 width of strands=293 micrometers
 thickness of sheath=less than 6 micrometers (Due to the size of the sheath and the lack of color contrast, the thickness of sheath was estimated with the 200× optical microscope.)

Tensile elongation at maximum load of the film was measured using the test method described above using three replicates, and the average was 229%, and the maximum load was 8.9 N. Permanent set of the film was measured using the test method described above using three replicates. The average of three samples was 10%. Load 1 at 100% elongation=2.6 N, Load 2 at 100% elongation=2.2 N.

Examples 22 to 25

Laminate Examples 22 to 25 were prepared according to the method of Example 17 with the following modifications. For each of Examples 22 to 25, the film of Example 21 was used. For Example 23, both the smooth roll and the patterned roll were heated at 125° F. (52° C.). For Example 24, 22 gsm hydrophobic carded nonwoven obtained from Fitesa with item number "C1223" and style "570D" was used instead of the spunlace nonwoven "SAWATEX 22628". For Example 25, both the smooth roll and the patterned roll were heated at 125° F. (52° C.), and 22 gsm hydrophobic nonwoven obtained from Fitesa with item number "C1223" and style "570D" was used instead of the spunlace nonwoven "SAWATEX 22628". The elongation to break, elongation at maximum load, maximum load, permanent set, load 1 at 100% elongation and load 2 at 100% elongation for the laminates of Examples 22 to 25 are shown in Table 2, below.

TABLE 2

| Example | Elongation to Break (%) | Elongation at Max load (%) | Max load (N) | Permanent set (%) | Load 1 at 100% (N) | Load 2 at 100% (N) |
|---|---|---|---|---|---|---|
| 22 | 137 | 122 | 7.00 | 22.6 | 5.80 | 4.42 |
| 23 | 231 | 143 | 8.30 | 15.6 | 5.25 | 4.21 |
| 24 | 145 | 117 | 7.14 | 25.1 | 6.26 | 4.77 |
| 25 | 177 | 124 | 7.06 | 17.6 | 5.36 | 4.45 |

Example 26

Example 26 was prepared using the method of Example 21 with the following modifications. The quench takeaway speed was 17 m/minute. The basis weight of film was 34.9 grams per square meter.

Using an optical microscope, the following film dimensions were measured:
 width of stripes=492 micrometers
 width of strands=358 micrometers
 thickness of sheath=less than 6 micrometers (Due to the size of the sheath and the lack of color contrast, the thickness of sheath was estimated with the 200× optical microscope.)

Tensile elongation at maximum load of the film was measured using the test method described above using three replicates, and the average was 239%, and the maximum load was 12.2 N. Permanent set of the film was measured using the test method described above using three replicates. The average of three samples was 9%. Load 1 at 100% elongation=3.4 N, Load 2 at 100% elongation=2.8 N.

Examples 27 to 30

Laminates of the film of Example 26 were made using the method of Examples 22 to 25 to prepare Examples 27 to 30. The elongation to break, elongation at maximum load, maximum load, permanent set, load 1 at 100% elongation and load 2 at 100% elongation for the laminates of Examples 27 to 30 are shown in Table 3, below.

TABLE 3

| Example | Elongation to Break (%) | Elongation at Max load (%) | Max load (N) | Permanent set (%) | Load 1 at 100% (N) | Load 2 at 100% (N) |
|---|---|---|---|---|---|---|
| 27 | 154 | 139 | 9.01 | 21.9 | 6.50 | 4.89 |
| 28 | 143 | 139 | 8.53 | 15.3 | 5.85 | 4.63 |
| 29 | 150 | 134 | 9.53 | 21.6 | 7.08 | 5.35 |
| 30 | 151 | 125 | 9.32 | 17.4 | 5.71 | 4.65 |

Example 31

Example 31 was made using the method of Example 21 with the following modifications. The extruder feeding the third cavity was loaded with a mixture of 69% styrene isoprene styrene block copolymer pellets obtained from Kraton Polymers under the trade designation "KRATON D1114 P" polymer and 31% of a tackifying resin obtained from ExxonMobil under the trade designation "ESCOREZ 1310LC". The quench takeaway speed was 13.4 m/minute. The basis weight of film was about 39 grams per square meter.

Using an optical microscope, the following film dimensions were measured:

width of stripes=634 micrometers width of strands=261 micrometers thickness of sheath=less than 6 micrometers (Due to the size of the sheath and the lack of color contrast, the thickness of sheath was estimated with the 200× optical microscope.)

Tensile elongation at maximum load of the film was measured using the test method described above using three replicates, and the average was 300%, and the maximum load was 15.8 N. Permanent set of the film was measured using the test method described above using three replicates. The average of three samples was 14%. Load 1 at 100% elongation=5.5 N, Load 2 at 100% elongation=4.1 N.

Examples 32 to 35

Laminates of the film of Example 31 were made using the method of Examples 22 to 25 to prepare Examples 32 to 35. The elongation to break, elongation at maximum load, maximum load, permanent set, load 1 at 100% elongation and load 2 at 100% elongation for the laminates of Examples 32 to 35 are shown in Table 4, below.

TABLE 4

| Example | Elongation to Break (%) | Elongation at Max load (%) | Max load (N) | Permanent set (%) | Load 1 at 100% (N) | Load 2 at 100% (N) |
|---|---|---|---|---|---|---|
| 32 | 188 | 187 | 13.30 | 21.6 | 7.91 | 5.77 |
| 33 | 188 | 186 | 13.66 | 17.0 | 7.45 | 5.71 |
| 34 | 102 | 77 | 6.70 | 23.8 | 8.45 | 6.20 |
| 35 | 117 | 113 | 8.34 | 20.1 | 7.84 | 5.91 |

Illustrative Examples 5 to 8

An elastic film available from 3M Company, St. Paul, Minn., under the trade designation "B430 ELASTIC FILM", which includes an elastomeric core layer between two less elastic skin layers, was laminated between two layers of 25 gsm spunlace nonwoven obtained from Sandler AG under the trade designation "SAWATEX 22628" or two layers of 22 gsm hydrophobic carded nonwoven obtained from Fitesa with item number "C1223" and style "570D". The elastic film was multi-layer in the thickness direction, but each layer extended across the width of the film. A sandwich of the elastic film between two layers of nonwoven was nipped at 200 psi ($1.4 \times 10^6$ Pa) between a smooth steel roll and a patterned roll with raised bonding sites making up 14% to 17% of its surface area. Both rolls were at 75° F. (24° C.) or 125° F. (52° C.). The nonwoven, bonding temperature, elongation to break, elongation at maximum load, maximum load, and permanent set for the laminates of Illustrative Examples (Ill. Ex.) 5 to 8 are shown in Table 5, below. Maximum load was the point at which delamination occurred for each of the samples. The film kept stretching after delamination of the nonwoven.

TABLE 5

| Example | Nonwoven supplier | Bonding Temp. (° C.) | Elongation at Max load (%) | Elongation to Break (%) | Max load (N) | Permanent set (%) |
|---|---|---|---|---|---|---|
| Ill. Ex. 5 | Sandler | 24 | 243 | 431 | 6.78 | 24.4 |
| Ill. Ex. 6 | Fitesa | 24 | 173 | 536 | 5.65 | 17.5 |
| Ill. Ex. 7 | Sandler | 52 | 234 | 339 | 7.20 | 26.1 |
| Ill. Ex. 8 | Fitesa | 52 | 278 | 524 | 7.07 | 19.8 |

Comparative Example

The Comparative Example was carried out as described in Example 1 of Int. Pat. App. Pub. No. WO 2011/119323 (Ausen et al.) with the following modifications. The thickness of the shims was 4 mils (0.102 mm) for shims with connection to the first cavity, 2 mils (0.051 mm) for shims with connection to the second cavity, and 2 mils (0.051 mm) for spacers that did not have a connection to either cavity. The extruder feeding the first cavity was 75% by weight polypropylene resin (obtained under the trade designation "3376" from Total Petrochemicals) and approximately 25% by weight polypropylene resin (obtained under the trade designation "EXXONMOBIL PP1024E4" from ExxonMobil), and 5% white concentrate in polypropylene. The extruder feeding the second cavity was filed with styrene isoprene styrene block copolymer pellets (obtained under the trade designation "KRATON G1643 M" polymer from Kraton Polymers). The maximum takeaway speed that could be achieved before reaching the maximum pressure of 4500 psi (31 megapascals) was 15 feet per minute (4.6 meters per minute). The basis weight of the film was 39 gsm. Using an optical microscope, the following film dimensions were measured:

width of stripes=200 micrometers
width of strands=40 micrometers

Elongation to break was measured using the test method described above using three replicates, and the average was 240%. Permanent set was measured using the test method described above using three replicates, and the average was 8.2%. Load 1 at 50% elongation=1.59 N, Load 2 at 50% elongation=0.92 N, Unload 2 at 50% elongation=0.68 N.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A film comprising stripes alternating with strands comprising a core and a sheath, wherein the film is non-fibrous, wherein the core is more elastic than both the sheath and the stripes, and wherein the stripes are made from a first polymeric composition, the core is made from a third polymeric composition, the sheath is made from a second polymeric composition that is different from the first polymeric composition and the third polymeric composition, and wherein the sheath separates the core from the stripes on either side of the core and at least partially covers the core at at least one major surface of the film.

2. The film of claim 1, wherein the stripes are made from a first polymeric composition that is found throughout the thickness of the stripes.

3. The film of claim 1, wherein the sheath forms part of both major surfaces of the film.

4. The film of claim 1, wherein the stripes have stretch-induced molecular orientation in a direction transverse to their lengths.

5. The film of claim 1, wherein the stripes have stretch-induced molecular orientation and are shirred in a direction parallel to their lengths.

6. A film article comprising an extensible region alongside a ribbon region, wherein the extensible region comprises the film of claim 1, and wherein the ribbon region comprises a film of a first polymeric composition, from which the stripes are made.

7. A laminate comprising the film of claim 1 joined to a fibrous carrier.

8. The laminate of claim 7, wherein the fibrous carrier is an extensible fibrous carrier with a tensile elongation at maximum load of at least 50 percent.

9. The laminate of claim 7, wherein the film is discontinuously bonded to the fibrous carrier, and wherein the fibrous carrier is bonded to the film predominantly at one of the stripes or the strands.

10. An absorbent article comprising the laminate of claim 7.

11. The laminate of claim 7, wherein the fibrous carrier is nonwoven.

12. A method of making the film of claim 1, the method comprising:

providing an extrusion die comprising at least a first cavity, a second cavity, a third cavity, a dispensing surface having a dispensing slot, and fluid passageways between the first, second, and third cavities and the dispensing slot, wherein the fluid passageways comprise a first fluid passageway extending from the first cavity to the dispensing slot, a third fluid passageway extending from the third cavity to the dispensing slot, at least two second fluid passageways extending from the second cavity to the dispensing slot on either side of the third fluid passageway, and wherein each of the second passageways has a dimension larger than the third passageway at the point where the third passageway enters the dispensing slot; and extruding the first, second, and third polymeric compositions from the first, second, and third cavities, respectively, so as to form the film.

13. The method of claim 12, wherein the fluid passageways are provided by a plurality of sequences of shims, wherein each sequence comprises at least one first shim that provides the first fluid passageway, at least one third shim that provides the third fluid passageway, and at least two second shims that provide the at least two second fluid passageways.

14. The method of claim 13, wherein each sequence of shims further comprises at least two spacer shims, each spacer shim being between the at least one third shim and one of the at least two second shims, wherein the spacer shim has a dispensing opening but lacks a passageway between the dispensing opening and any of the first, second, or third cavities.

15. The method of claim 12, wherein the extrusion die further comprises a fourth fluid passageway extending from the first cavity to the dispensing slot.

16. The method of claim 15, wherein the fourth fluid passageway is provided by a plurality of shims, wherein the plurality of shims comprises a plurality of a second sequence of shims.

17. The method of claim 16, wherein the second sequence of shims includes a spacer shim with a dispensing opening but with no passageway between the dispensing opening and the first cavity.

18. The film of claim 1, wherein the sheath extends around at least 60 percent of the outer surface of the core.

19. The film of claim 1, wherein the sheath extends around at least 80 percent of the outer surface of the core.

20. The film of claim 1, wherein the sheath surrounds the core.

* * * * *